US012770966B2

(12) United States Patent
Jeon et al.

(10) Patent No.: US 12,770,966 B2
(45) Date of Patent: Oct. 20, 2026

(54) BATTERY MODULE AND MANUFACTURING METHOD OF BATTERY MODULE

(71) Applicant: SK ON CO., LTD., Seoul (KR)

(72) Inventors: Hae Ryong Jeon, Daejeon (KR); Ji Eun Kang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 946 days.

(21) Appl. No.: 18/091,812

(22) Filed: Dec. 30, 2022

(65) Prior Publication Data

US 2023/0253662 A1 Aug. 10, 2023

(30) Foreign Application Priority Data

Feb. 4, 2022 (KR) ........................ 10-2022-0014810

(51) Int. Cl.
*H01M 50/289* (2021.01)
*H01M 10/653* (2014.01)
(Continued)

(52) U.S. Cl.
CPC ....... *H01M 50/289* (2021.01); *H01M 10/653* (2015.04); *H01M 50/211* (2021.01);
(Continued)

(58) Field of Classification Search
CPC ........... H01M 10/6554; H01M 10/658; H01M 50/209; H01M 2220/20; H01M 10/613; H01M 10/625; H01M 50/271; H01M 10/653; H01M 10/655; H01M 50/204; H01M 50/242; H01M 50/244
See application file for complete search history.

(56) References Cited

U.S. PATENT DOCUMENTS 3,320,095 A * 5/1967 Bingeman ............... H01M 6/42 429/151
7,131,242 B2 * 11/2006 Martensson ............ E04F 15/02 52/592.1
(Continued)

FOREIGN PATENT DOCUMENTS

JP 2018-530107 A 10/2018
KR 10-2018-0106067 A 10/2018
(Continued)

OTHER PUBLICATIONS

Bryce, Douglas M., Table III-1. Suggested Melt Temperatures for Various Plastics, Plastic Injection Molding, vol. I—Manufacturing Process Fundamentals, 1999, Society of Manufacturing Engineers (SME).
(Continued)

*Primary Examiner* — Michael L Dignan
(74) *Attorney, Agent, or Firm* — IP&T GROUP LLP

(57) ABSTRACT

A battery module includes a cell stack in which a plurality of battery cells are stacked; and a housing having a plurality of accommodation spaces partitioned by a partition member, to accommodate a plurality of the cell stack, wherein the housing includes a first frame and a second frame, coupled to each other to form the plurality of accommodation spaces, wherein the first frame and the second frame include a coupling portion that is coupled in a fitting coupling manner, respectively.

18 Claims, 16 Drawing Sheets

(51) Int. Cl.
*H01M 50/211* (2021.01)
*H01M 50/507* (2021.01)
*H01M 10/04* (2006.01)
*H01M 50/183* (2021.01)

(52) U.S. Cl.
CPC ...... *H01M 50/507* (2021.01); *H01M 10/0481* (2013.01); *H01M 50/183* (2021.01)

(56) References Cited

U.S. PATENT DOCUMENTS

| | | | | |
|---|---|---|---|---|
| 7,380,383 | B2 * | 6/2008 | Olofsson | E04B 1/6125 403/381 |
| 11,063,316 | B2 | 7/2021 | Kim et al. | |
| 12,431,570 | B2 | 9/2025 | Jo et al. | |
| 2007/0072071 | A1 * | 3/2007 | Lee | H01M 50/627 29/623.1 |
| 2015/0037626 | A1 | 2/2015 | Malcolm et al. | |
| 2015/0280190 | A1 * | 10/2015 | Ohshiba | H01M 50/209 429/100 |
| 2018/0159096 | A1 | 6/2018 | Kim et al. | |
| 2019/0181405 | A1 * | 6/2019 | Kim | H01M 10/6556 |
| 2020/0373528 | A1 | 11/2020 | Park et al. | |
| 2021/0028517 | A1 | 1/2021 | Choi et al. | |
| 2021/0098760 | A1 * | 4/2021 | Jeon | H01M 10/6557 |
| 2021/0104800 | A1 | 4/2021 | Liao et al. | |
| 2021/0126229 | A1 | 4/2021 | Zhao et al. | |
| 2021/0135175 | A1 | 5/2021 | An et al. | |
| 2021/0184303 | A1 * | 6/2021 | Lee | H01M 50/211 |
| 2021/0320374 | A1 | 10/2021 | Lee et al. | |
| 2021/0336287 | A1 | 10/2021 | Kim et al. | |
| 2022/0021060 | A1 | 1/2022 | Yoo et al. | |
| 2023/0099554 | A1 * | 3/2023 | Jo | H01M 10/0472 429/433 |

FOREIGN PATENT DOCUMENTS

| | | | |
|---|---|---|---|
| KR | 10-2019-0069873 | A | 6/2019 |
| KR | 10-2019-0135865 | A | 12/2019 |
| KR | 10-2020-0086170 | A | 7/2020 |
| KR | 10-2020-0107213 | A | 9/2020 |
| KR | 10-2020-0143977 | A | 12/2020 |
| KR | 10-2021-0037885 | A | 4/2021 |
| KR | 10-2021-0053053 | A | 5/2021 |
| KR | 10-2022-0001228 | A | 1/2022 |

OTHER PUBLICATIONS

Gangolli, S., Physical Constants of Chemical Substances, Dictionary of Substances and Their Effects (DOSE, 3rd Electronic Edition), 2005, Royal Society of Chemistry (RSC).
Office Action for U.S. Appl. No. 18/091,904 issued by the USPTO on Dec. 23, 2025.
Office Action for Korean Patent Application No. 10-2022-0014810 issued by the Korean Patent Office on Mar. 11, 2026.
Office Action for U.S. Appl. No. 18/091,904 issued by the USPTO on Apr. 9, 2026.
Notice of Allowance for Korean Patent Application No. 10-2022-0014811 issued by the Korean Patent Office on Jul. 9, 2026.

* cited by examiner

BATTERY MODULE AND MANUFACTURING METHOD OF BATTERY MODULE

CROSS-REFERENCE TO RELATED APPLICATION(S)

This application claims benefit of priority to Korean Patent Application No. 10-2022-0014810 filed on Feb. 4, 2022 in the Korean Intellectual Property Office, the disclosure of which is incorporated herein by reference in its entirety.

BACKGROUND

1. Field

The present disclosure relates to a battery module having a cell stack in which a plurality of battery cells formed of secondary batteries are stacked, a battery pack including the same, and a method of manufacturing the battery module.

2. Description of Related Art

Unlike a primary battery, a secondary battery may be repeatedly charged and discharged, and therefore, may be applied to devices within various fields such as digital cameras, mobile phones, notebook computers, hybrid vehicles, and electric vehicles. Examples of the secondary battery include a nickel-cadmium battery, a nickel-metal hydride battery, a nickel-hydrogen battery, a lithium secondary battery, or the like.

In general, a secondary battery may be manufactured as a pouch-type battery cell having flexibility or a can-type battery cell having a prismatic or cylindrical shape having rigidity. A plurality of battery cells may be electrically connected and used. For example, a plurality of battery cells may form a cell stack. At least one cell stack may be disposed in a module housing to form a battery module.

An accommodation space for accommodating the cell stack may be formed in the module housing. A width of the cell stack may be similar to a width of the accommodation space. In order to insert the cell stack into the accommodation space, it may be necessary to widen an opened end of the module housing to widen an entrance of the accommodation space. Therefore, in a battery module according to the prior art, there may be a problem in that a process of assembling a cell stack in an accommodation space inside a module housing may be complicated. Moreover, when performing the process of assembling the cell stack in the module housing, there may be problems in that deformation may occur in the module housing in the process of widening the opened end of the module housing, or damage to the cell stack may occur due to contact between the module housing and the cell stack.

A module housing having an I-shaped (a laid H-shaped) frame in which a partition wall crossing a central portion of an accommodation space between an upper plate and a lower plate is installed has been proposed. In the module housing having such an I-shaped frame, since a cell stack is accommodated on both sides of the partition wall, there may be a problem in that a process of assembling the cell stack to the module housing may be more complicated.

In addition, in a battery module having an I-shaped frame, a cell stack and a busbar assembly may be electrically connected in a state in which the cell stack is installed on both sides of a partition wall. The busbar assembly may include a plurality of busbars, and the plurality of busbars may be connected to a plurality of electrode leads of the cell stack. In this case, in a battery module according to the prior art, a plurality of cell stacks installed on both sides of a partition may be combined with a single busbar assembly. However, when a plurality of cell stacks are connected as the single busbar assembly, since tolerance in assembly occurs during a process of installing the cell stacks to a module housing in advance, there may be problems in that it may be difficult to perform a process of connecting busbars, and the occurrence of welding defects between electrode leads of battery cells and the busbars may increase.

Furthermore, there may be a limit to the number of battery cells included in a cell stack to improve assembly performance and reduce defects in assembling the cell stack in a module housing and/or in assembling the cell stack and a busbar assembly. Accordingly, a conventional battery module having an I-shaped frame may have a problem in that a height of the cell stack cannot be increased.

SUMMARY

An aspect of the present disclosure is to provide a battery module allowing a process of inserting a cell stack into a module housing to be easily performed, a battery pack including the same, and a method of manufacturing the battery module.

Further, an aspect of the present disclosure is to provide a battery module improving assembly performance between a busbar assembly and a cell stack, a battery pack including the same, and a method of manufacturing the battery module.

In addition, an aspect of the present disclosure is to provide a battery module increasing a height of the battery module, a battery pack including the same, and a method of manufacturing the battery module.

Further, an aspect of the present disclosure is to provide a battery module having improved cooling performance, a battery pack including the same, and a method of manufacturing the battery module.

In addition, an aspect of the present disclosure is to provide a battery module reducing or delaying heat propagation between battery cells and/or between cell stacks, a battery pack including the same, and a method of manufacturing the battery module.

According to an aspect of the present disclosure, a battery module includes a cell stack in which a plurality of battery cells are stacked; and a housing having a plurality of accommodation spaces partitioned by a partition member, to accommodate a plurality of the cell stack, wherein the housing includes a first frame and a second frame, coupled to each other to form the plurality of accommodation spaces, wherein the first frame and the second frame include a coupling portion that is coupled in a fitting coupling manner, respectively.

In an embodiment, the first frame and the second frame may have a first coupling position for inserting the cell stack into the plurality of accommodation spaces, and a second coupling position, of which a gap between the first frame and the second frame is narrower than those in the first coupling position, wherein the coupling portion may be configured such that the first frame and the second frame have the first coupling position and the second coupling position.

In an embodiment, in the second coupling position, the first frame and the second frame may be in a state of pressing the cell stack in a direction away from the first coupling position to the second coupling position.

In an embodiment, in the second coupling position, the first frame and the second frame may be in a state of pressing the cell stack in a direction in which the plurality of battery cells are stacked. In this case, the plurality of battery cells may be arranged between the first frame and the second frame in a horizontal direction, and may be stacked in a vertical direction.

In an embodiment, the coupling portion may include a first coupling portion included in the first frame and a second coupling portion included in the second frame, wherein one of the first coupling portion and the second coupling portion may include a tongue portion, and the other of the first coupling portion and the second coupling portion may include a groove portion into which the tongue portion is inserted and coupled.

In an embodiment, the first coupling portion and the second coupling portion may include a stopping member maintaining a coupled state of the first coupling portion and the second coupling portion in the first coupling position, respectively. In this case, the stopping member may include a protrusion located on one of an inner circumferential surface of the groove portion and an outer circumferential surface of the tongue portion, and a recess located on the other thereof.

In an embodiment, the tongue portion may be maximally inserted into an inner space of the groove portion in the second coupling position.

In an embodiment, the first coupling portion and the second coupling portion may include a position fixing member maintaining a coupled state of the first coupling portion and the second coupling portion in the second coupling position, respectively. In this case, the position fixing member may include an insertion-coupling structure formed between an inner circumferential surface of the groove portion and an outer circumferential surface of the tongue portion.

In an embodiment, based on a cross-section in a direction in which the tongue portion extends, the tongue portion and the groove portion may have a shape in which a width decreases in a direction in which the tongue portion extends, respectively, and at least a portion of the tongue portion may be exposed to an outside of the groove portion in the first coupling position. In this case, the tongue portion may be forcedly inserted into the groove portion in the second coupling position. In addition, the tongue portion may have a width narrowing at a first inclination angle in a direction in which the tongue portion extends, and the groove portion may have a width narrowing at a second inclination angle, narrower than the first inclination angle, in a direction in which the tongue portion extends.

In an embodiment, an adhesive member fixing a position of the tongue portion in the second coupling position may be disposed in the groove portion.

The first frame may include a first plate facing a first surface of the cell stack, and a first extension plate extending from the first plate to face a second surface, perpendicular to the first surface, and the second frame may include a second plate spaced apart from the first plate, and a second extension plate extending from the second plate and facing the second surface of the cell stack, wherein the first extension plate and the second extension plate may correspond to the partition member. In this case, a gap between the first plate and the second plate in the first coupling position may be wider than those in the second coupling position.

In an embodiment, the first frame and the second frame may have a T-shaped cross-section, respectively, and two accommodation spaces in which the cell stack is accommodated on both sides of the partition member, respectively, based on the partition member, may be formed in the housing.

In an embodiment, the housing may further include a cover plate forming the plurality of accommodation spaces together with the first frame and the second frame, wherein the cover plate may include a side plate disposed to oppose the first extension plate and the second extension plate and respectively connected to both ends of the first plate and both ends of the second plate, and an end plate disposed on front and rear surfaces of the cell stack.

In addition, a battery module according to an embodiment of the present disclosure may further include a busbar assembly disposed between the cell stack and the end plate, wherein the busbar assembly may include at least one a busbar electrically connected to electrode leads of the plurality of the battery cells, and a busbar support member on which the at least one busbar is installed, and wherein the side plate may be fastened to the busbar support member.

In an embodiment, the plurality of the battery cells may include a pouch-type secondary battery in which a sealing portion is formed on three sides of a cell body portion for accommodating an electrode assembly, and wherein the cell stack may be disposed such that a contact surface of the cell body portion on which the sealing portion is not formed opposes the side plate. In this case, a thermally conductive adhesive may be disposed between the contact surface and the side plate, and heat generated by the cell stack may be discharged through the side plate externally.

In an embodiment, an outer surface of the side plate may be in contact with a cooling member.

In an embodiment, a heat insulating member may be installed between the cell stack and the partition member. The heat insulating member may include at least one of mica, silica, silicate, graphite, alumina, ceramic wool, or aerogel.

In an embodiment, an insulating pad may be installed between the heat insulating member and the cell stack.

In addition, a battery module according to an embodiment of the present disclosure may include at least one cell stack in which a plurality of battery cells are stacked; and a housing accommodating the at least one cell stack, wherein the housing may include a first frame and a second frame, coupled to each other to form an accommodation space in which the at least one cell stack is accommodated, wherein the first frame and the second frame may be disposed to be movable from the first coupling position inserting the at least one cell stack into the accommodation space, to the second coupling position in which a gap between the first frame and the second frame is narrowed in a state in which the at least one cell stack is inserted into the accommodation space.

According to an aspect of the present disclosure, a method of manufacturing a battery module includes preparing a first frame and a second frame, coupled to each other to form at least one accommodation space, and at least one cell stack to be respectively inserted into the at least one accommodation space; coupling the first frame and the second frame to have a first coupling position for arranging the at least one cell stack in the at least one accommodation space; and moving the first frame and the second frame to be a second coupling position, of which a gap between the first frame and the second frame is narrower than those in the first coupling position, in a state in which the at least one cell stack is disposed in the at least one accommodation space.

In an embodiment, in the moving the first frame and the second frame to be a second coupling position, the first frame and the second frame may press the cell stack in a direction in which the at least one cell stack is stacked.

In an embodiment, the first frame and the second frame may form two accommodation spaces partitioned by a partition member, wherein the second coupling operation may be configured to move the first frame and the second frame in a state in which the at least one cell stack is disposed in the two accommodation spaces.

In addition, in an embodiment, the present disclosure provides a battery pack including the battery module, described above; and a pack case accommodating a plurality of the battery module.

BRIEF DESCRIPTION OF DRAWINGS

The above and other aspects, features, and advantages of the present disclosure will be more clearly understood from the following detailed description, taken in conjunction with the accompanying drawings, in which:

FIG. 9A illustrates a first frame and a second frame before coupling thereof, FIG. 9B illustrates the first frame and the second frame in a first coupling position, and FIG. 9C illustrates the first frame and the second frame in a second coupling position.

FIG. 11A illustrates a first coupling position, and FIG. 11B illustrates a second coupling position.

FIG. 12A illustrates a first coupling position, and FIG. 12B illustrates a second coupling position.

FIG. 14A is a front view thereof, and FIG. 14B is a rear view thereof.

DETAILED DESCRIPTION

Figure 1:
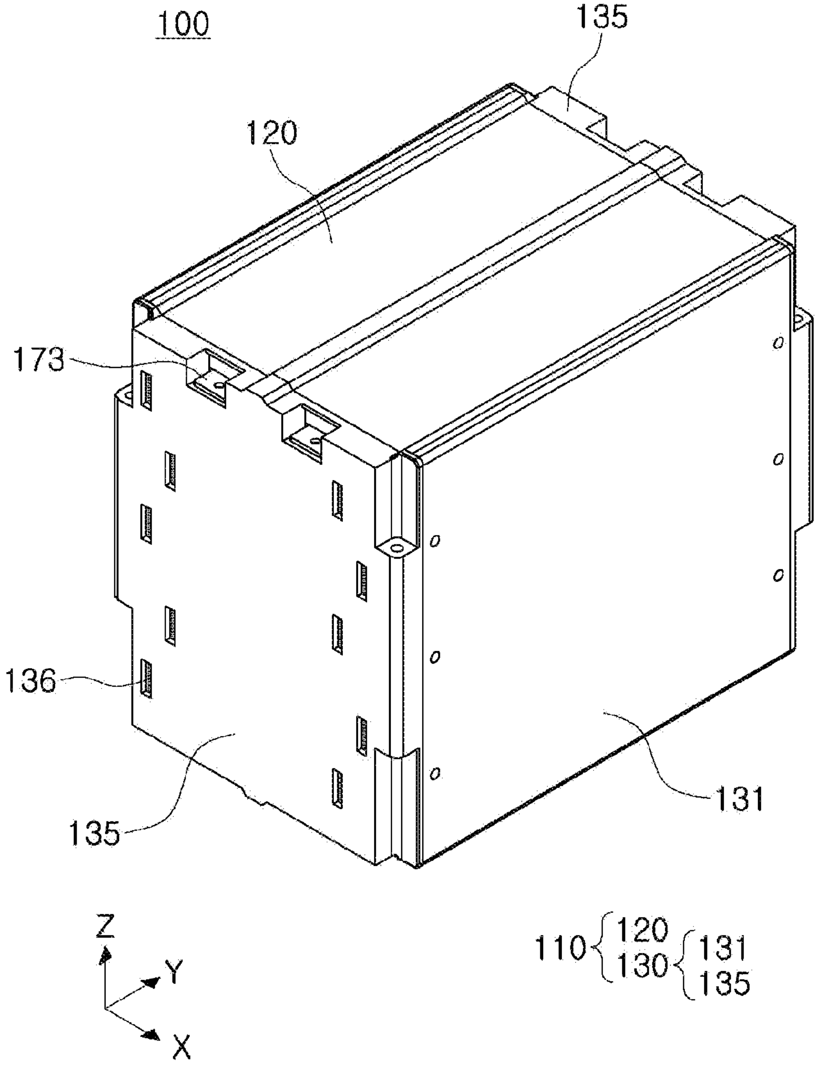
FIG. 1 is a perspective view of a battery module according to an embodiment of the present disclosure.

Prior to the detailed description of the present disclosure, terms or words used in the specification and claims, described below, should not be construed as being limited to ordinary or dictionary meanings, and the inventors should develop their own inventions in the best possible manner. It should be interpreted as having a meaning and concept consistent with the technical idea of the present disclosure, based on the principle that it may be appropriately defined as a concept of a term for explanation. Therefore, it should be understood that since embodiments described in the specification and configurations illustrated in the drawings may be only the most preferred embodiments of the present disclosure, and do not represent all the technical ideas of the present disclosure, there may be various equivalents and variations to be replaced at the time of filing the present disclosure.

Hereinafter, preferred embodiments of the present disclosure will be described in detail with reference to the accompanying drawings. In this case, it should be noted that the same components in the accompanying drawings may be denoted by the same reference numerals as much as possible. In addition, detailed descriptions of well-known functions and configurations that may obscure the gist of the present disclosure will be omitted. For the same reason, some components may be exaggerated, omitted, or schematically illustrated in the accompanying drawings, and a size of each of the components may not fully reflect an actual size thereof.

First, a battery module 100 according to an embodiment of the present disclosure will be described with reference to FIGS. 1 and 2. FIG. 1 is a perspective view of a battery module 100 according to an embodiment of the present disclosure, and FIG. 2 is an exploded perspective view of the battery module 100 illustrated in FIG. 1.

Figure 2:
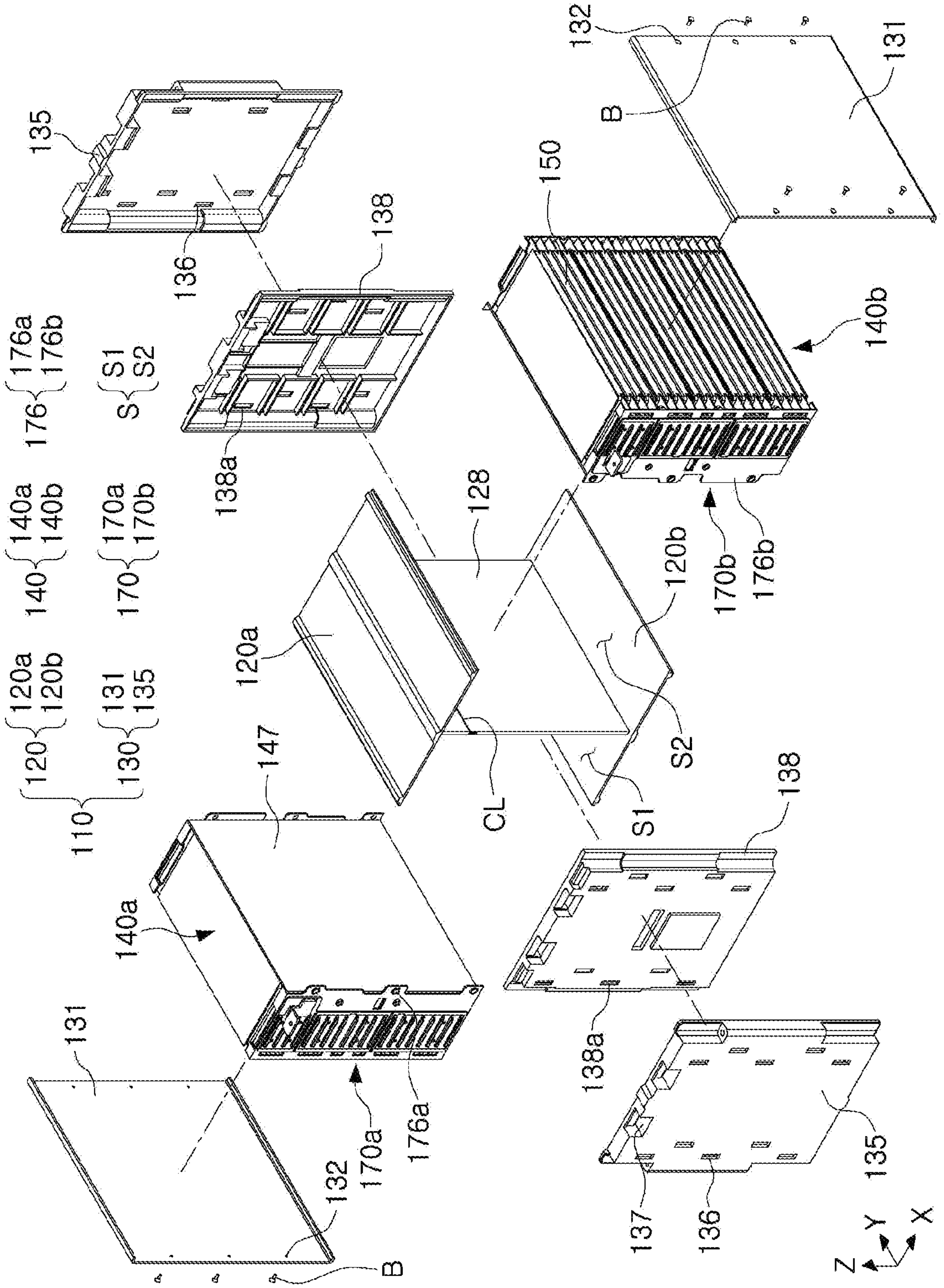
FIG. 2 is an exploded perspective view of the battery module illustrated in FIG. 1.

Referring to FIGS. 1 and 2, a battery module 100 according to an embodiment of the present disclosure may include a cell stack 140 and a housing 110 accommodating the cell stack 140.

The cell stack 140 may form a state in which a plurality of battery cells 150 are stacked. A battery cell 150 may be configured as a secondary battery. As an example, the battery cell 150 may be formed of a lithium secondary battery, but the present disclosure is not limited thereto. For example, as the battery cell 150, other types of secondary batteries such as a nickel-cadmium battery, a nickel-metal hydride battery, a nickel-hydrogen battery, or the like may be used. In addition, the battery cell 150 may be formed of a pouch-type secondary battery. Usage of a prismatic secondary battery as the battery cell 150 may not be excluded.

The housing 110 may define an exterior of the battery module 100, and may be disposed outside the cell stack 140 to protect the battery cell 150 from an external environment.

At least one accommodation space S (e.g., S1 and S2) may be formed in the housing 110 to accommodate the cell stack 140. For example, the housing 110 may have a plurality of accommodation spaces S1 and S2 partitioned by a partition member 128. The cell stack 140 may be accommodated in each of the accommodation spaces S1 and S2.

Hereinafter, for convenience of description, a case in which the partition member 128 is installed in the housing 110 will be described as an example.

The housing 110 may form a plurality of accommodation spaces S (e.g., S1 and S2) divided in a first direction X by a partition member 128 to accommodate a plurality of cell stacks 140. For example, in the housing 110, a first accommodation space S1 and a second accommodation space S2 may be formed on a first side and a second side of the partition member 128, respectively. For example, the first accommodation space S1 may be formed on a first side of the first direction X with respect to the partition member 128, and the second accommodation space S2 may be formed on a second side of the first direction X with respect to the partition member 128.

The partition member 128 in the housing 110 may have a frame shape to improve rigidity of the housing 110. For example, the partition member 128 may constitute a portion of a frame member 120. In this case, the frame member 120 may have a first accommodation space S1 and a second accommodation space S2, partitioned by the partition member 128.

The frame member 120 may have a divided structure to easily accommodate the cell stack 140 in each of the accommodation spaces S1 and S2. For example, the frame member 120 may have a structure divided into a first frame 120*a* and a second frame 120*b*, based on a dividing line CL. In this case, the first frame 120*a* and the second frame 120*b* may be coupled to each other to form a plurality of accommodation spaces S1 and S2. For example, the first frame 120*a* and the second frame 120*b* may have a T-shaped cross-section, respectively, and two accommodation spaces S (i.e., S1 and S2) in which the cell stack 140 is accommodated on both sides, respectively, based on the partition member 128, may be formed in the housing 110. The first frame 120*a* and the second frame 120*b* may form an I-shaped (a laid H-shaped) frame structure in a state in which they are coupled to each other.

In an embodiment that may not be directly related to a process of inserting the cell stack 140 into the accommodation spaces S1 and S2, the first frame 120*a* and the second frame 120*b* may have an integrated structure. In addition, the embodiment of FIG. 2 illustrates a case in which two accommodation spaces S (i.e., S1 and S2) are formed, based on an I-shaped frame, for example, the partition member 128. In an embodiment of the present disclosure, it may not be excluded that the number of accommodation spaces S formed in the housing 110 is one (1). In this case, the frame member 120 may form a U-shaped frame in which an end is opened, in a state in which the first frame 120*a* and the second frame 120*b* are coupled.

The housing 110 may include a cover plate 130 coupled to the frame member 120. The cover plate 130 may be coupled to the frame member 120. A plurality of accommodation spaces S1 and S2 may be formed between the cover plate 130 and the frame member 120. For example, the cover plate 130 may cover an open portion of the accommodation spaces S1 and S2 formed by the first frame 120*a* and the second frame 120*b*.

The cover plate 130 may include a side plate 131 and an end plate 135. The side plate 131 may be disposed to be spaced apart from both sides of the partition member 128 in the first direction X. The frame member 120 and the side plate 131 may be coupled to each other to have a shape in which both ends are opened. The end plate 135 may cover both opened ends in a state in which the frame member 120 and the sideplate 131 are coupled. The end plate 135 may be disposed on front and rear surfaces of the cell stack 140.

The housing 110 may perform a function for cooling or dissipating heat of the battery module 100. To this end, at least some of the frame member 120, the side plate 131, and the end plate 135 may be formed of a material having high thermal conductivity, such as a metal. For example, the frame member 120, the side plate 131, and the end plate 135 may be formed of an aluminum material. A material of the frame member 120, a material of the side plate 131, and a material of the endplate 135 are not limited thereto, and a variety of materials may be used as long as the materials have strength and thermal conductivity, similar to that of a metal, even if the materials are not metal.

The number of cell stacks 140 may correspond to the number of accommodation spaces S1 and S2 such that the cell stacks 140 are accommodated in each of the accommodation spaces S1 and S2. For example, when the first accommodation space S1 and the second accommodation space S2 are formed on the first side and the second side of the partition member 128, respectively, the cell stack 140 may include a first stack 140*a* accommodated in the first accommodation space S1, and a second stack 140*b* accommodated in the second accommodation space S2.

A busbar assembly 170 may be connected to the cell stack 140 for electrical connection of the battery cells 150. The busbar assembly 170 may have a separate structure to facilitate assembly with the cell stack 140. For example, the number of busbar assemblies 170 may correspond to the number of cell stacks 140. When two cell stacks 140 are applied, the busbar assembly 170 may include a first assembly 170*a* electrically connected to the first stack 140*a* and a second assembly 170*b* electrically connected to the second stack 140*b*. The first assembly 170*a* and the second assembly 170*b* may be separated from each other. The first stack 140*a* may be installed in the first accommodation space S1 in a state coupled to the first assembly 170*a*, and the second stack 140*b* may be installed in the second accommodation space S2 in a state coupled to the second assembly 170*b*. The first assembly 170*a* and the second assembly 170*b* may be connected through a connection portion 176. The connection portion 176 may include a first connection portion 176*a* and a second connection portion 176*b*, arranged to oppose each other. The first connection portion 176*a* and the second connection portion 176*b* may be arranged to oppose each other in the first direction X. In a state in which the cell stack 140 and the busbar assembly 170 are arranged in the accommodation space S (e.g., S1 and S2), the first connection portion 176*a* of the first assembly 170*a* and the second connection portion 176*b* of the second assembly 170*b* may be connected to each other. For example, the first connection portion 176*a* and the second connection portion 176*b* may face each other.

A partition heat insulating member 147 may be disposed on a surface of the cell stack 140 opposite to the partition member 128. The partition heat insulating member 147 may be formed of a material having at least one property of flame retardancy, heat resistance, heat insulation, or insulation, to prevent the partition member 128 from being damaged by high-temperature thermal energy or flames generated in the cell stack 140. The partition heat insulating member 147 will be described in detail later.

The side plate 131 may include an assembly hole 132 for assembling, and may be coupled to the busbar assembly 170 through a fastening means B such as a bolt or the like passing through the assembly hole 132.

The end plate 135 may be installed to oppose the busbar assembly 170. A gas outlet 136 for discharging gas to an outside of the end plate 135 may be formed in the end plate 135. Gas generated in the cell stack 140 may be discharged externally through a vent hole 177 (see FIG. 3) of the busbar assembly 170 and the gas outlet 136 of the end plate 135. In the detailed description and the claims, 'gas' may be defined to include all of electrolyte gas, combustion gas, combustion materials contained in the combustion gas, flame, and the like.

A terminal through-hole 137 may be formed in the end plate 135 such that an electrode terminal 173 of the busbar assembly 170 is exposed to an outside of the housing 110.

An electrically insulating member 138 may be installed between the end plate 135 and the busbar assembly 170. A gas flow port 138*a* may be formed in the insulating member 138. The gas flow port 138*a* may be formed in a position corresponding to the gas outlet 136 such that gas discharged through the busbar assembly 170 is discharged through the gas outlet 136 of the end plate 135.

Figure 3:
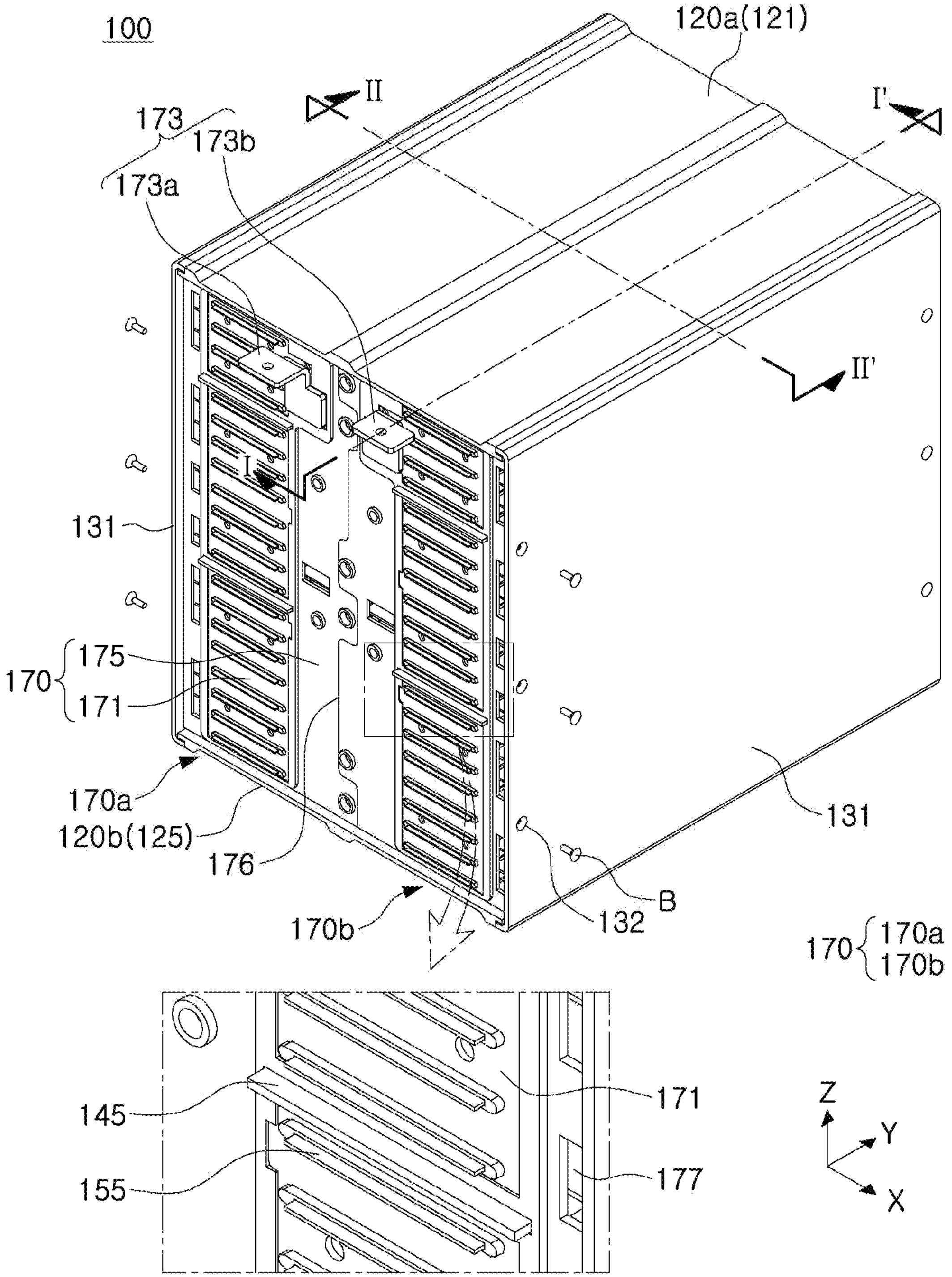
FIG. 3 is a perspective view illustrating a state in which the end plate and the insulating member are removed from FIG. 1.

FIG. 3 is a perspective view illustrating a state in which the endplate 135 and the heat insulating member 138 (see FIG. 2) are removed from FIG. 1.

Referring to FIG. 3 together with FIG. 2, the busbar assembly 170 may include at least one busbar 171 electrically connected to electrode leads 155 of the battery cells 150, and a busbar support member 175 in which the busbar 171 is installed. The busbar support member 175 may be formed of an electrically insulating material for insulation between the busbar 171 and a battery cell 150.

A coupling hole 172 (see FIG. 5) through which an electrode lead 155 of the battery cell 150 passes may be formed in the busbar 171. The electrode lead 155 may be connected to the busbar 171 while being inserted into the coupling hole 172, to be electrically connected to the busbar 171.

An electrode terminal 173 for electrical connection with an external source may be connected to some of the busbars 171. The electrode terminal 173 may include a first electrode terminal 173*a* and a second electrode terminal 173*b*.

In addition, a vent hole 177 for discharging gas generated from the cell stack 140 to the outside of the busbar assembly 170 may be formed in the busbar support member 175. In the busbar support member 175, a heat insulating member passing hole 179 (see FIG. 5) through which a heat insulating member 145 disposed between the battery cells 150 passes may be formed.

The busbar assembly 170 may be separated into the first assembly 170*a* electrically connected to the first stack 140*a* and the second assembly 170*b* electrically connected to the second stack 140*b*. The first assembly 170*a* and the second assembly 170*b* may have an engaging shape that may be connected to each other in the first direction X through the connection portion 176.

The cell stack 140 may be surrounded by the first frame 120*a*, the second frame 120*b*, the side plate 131, and the busbar assembly 170. Specifically, upper and lower surfaces of the cell stack 140 may be covered by a first plate 121 of the first frame 120*a* and a second plate 125 of the second frame 120*b*, respectively. Front and rear surfaces of the cell stack 140 may be covered by the busbar assembly 170. In a state in which the cell stack 140 is accommodated in the accommodation space S (e.g., S1 and S2) of the frame member 120, a side surface of the frame member 120 exposed externally may be covered by the side plate 131. Specifically, based on the first direction X, the side plate 131, the first stack 140*a*, the partition member 128, the second stack 140*b*, and the side plate 131 may be sequentially arranged. Therefore, the first stack 140*a* and the second stack 140*b* included in the cell stack 140 may be covered by the partition member 128 and one side plate 131, based on the first direction X. The partition member 128 may be formed by coupling the first frame 120*a* and the second frame 120*b* to each other.

Also, the side plate 131 may be fastened to the busbar support member 175 of the busbar assembly 170. To this end, the assembly hole 132 through which the fastening means B such as a bolt or the like passes may be formed in the side plate 131, and a fastening hole P4 (see FIG. 5) through which the fastening means B is fastened may be formed in the busbar support member 175. According to the fastening between the side plate 131 and the busbar assembly 170, rigidity of the housing 110 may be improved, and a constant gap may be maintained between the side plate 131 and the cell stack 140.

Figure 4:
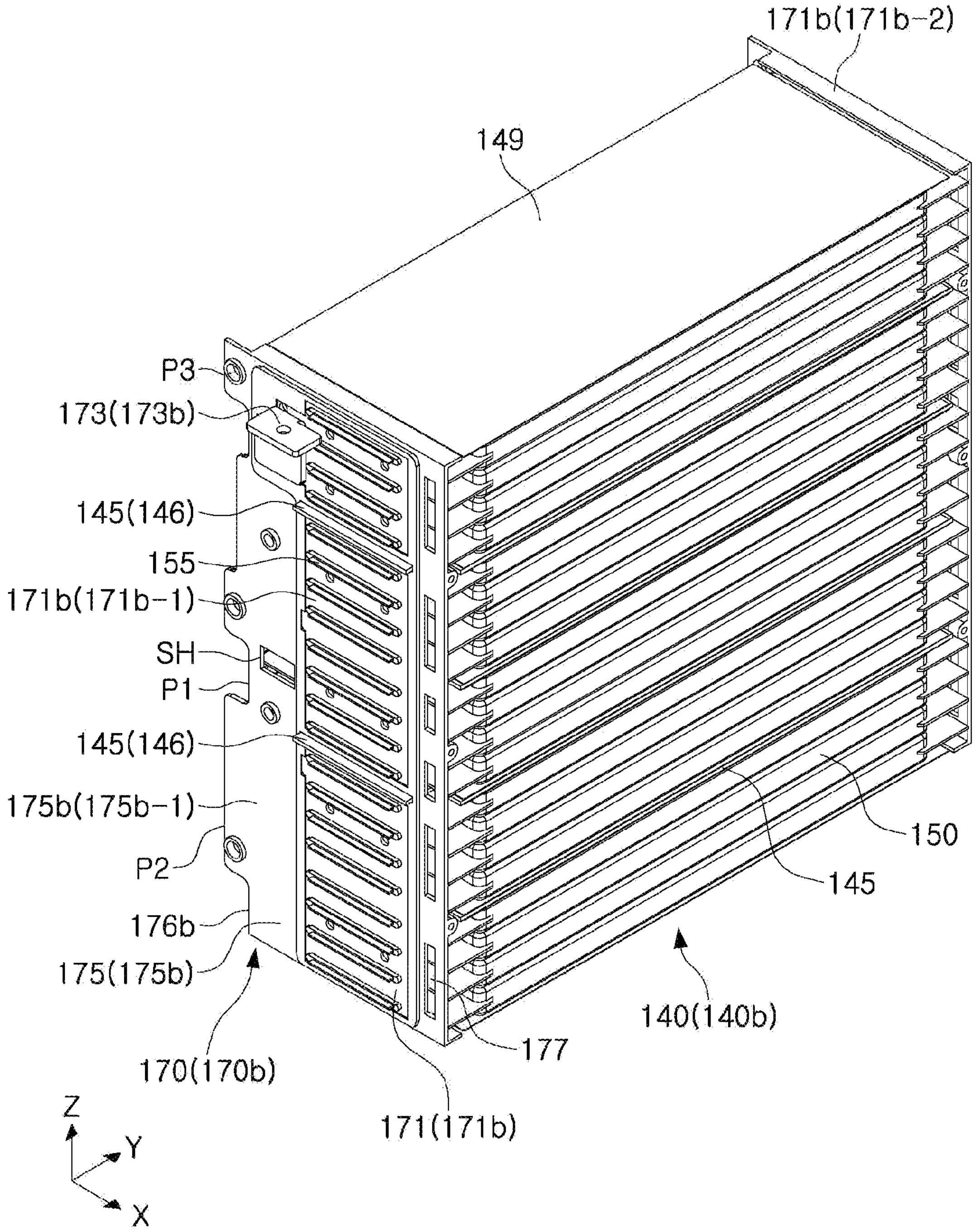
FIG. 4 is a perspective view illustrating a state in which the second stack of the cell stack and the second assembly of the busbar assembly in the battery module illustrated in FIG. 3 are coupled.
Figure 5:
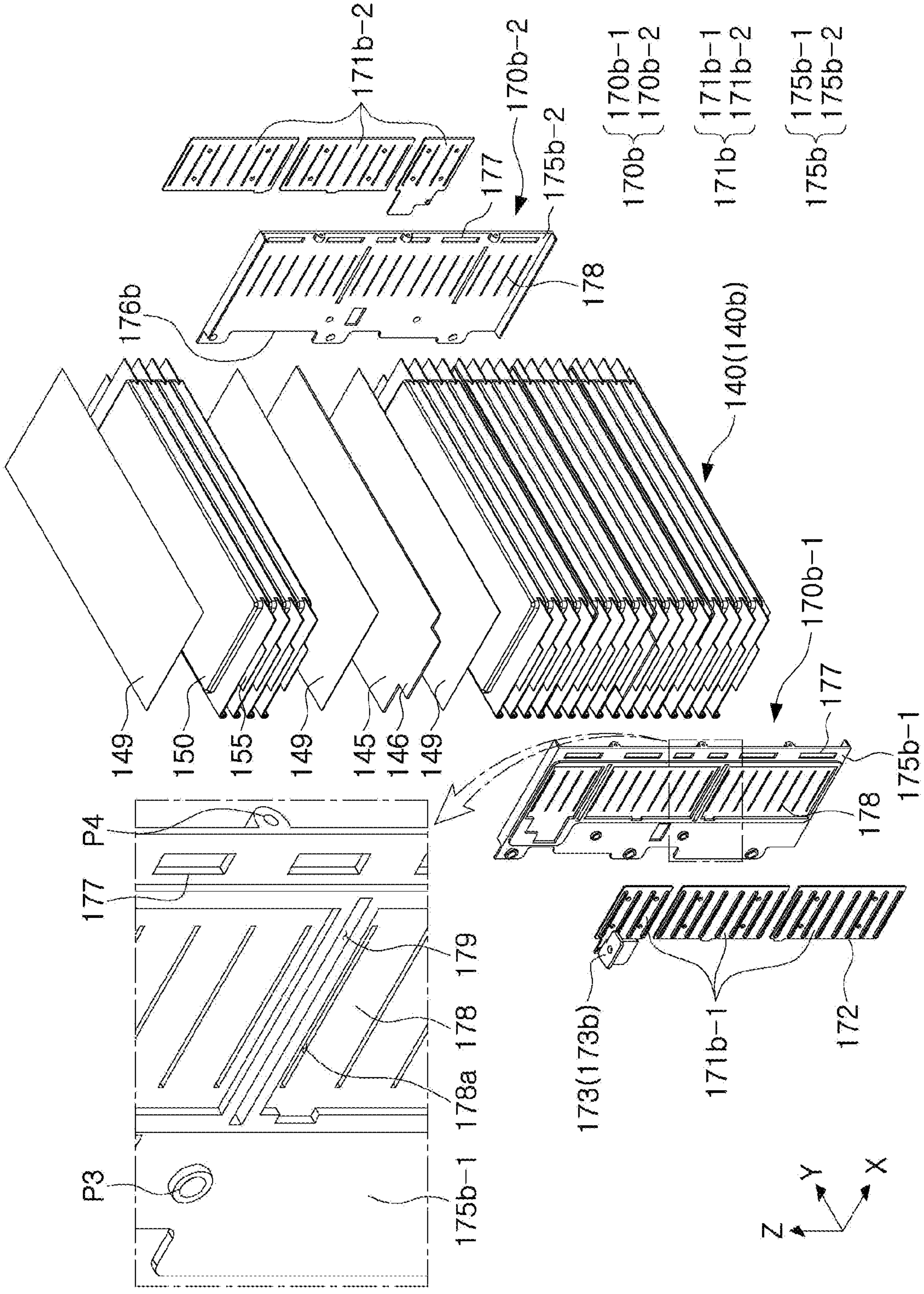
FIG. 5 is an exploded perspective view of the cell stack and the busbar assembly illustrated in FIG. 4.
Figure 6:
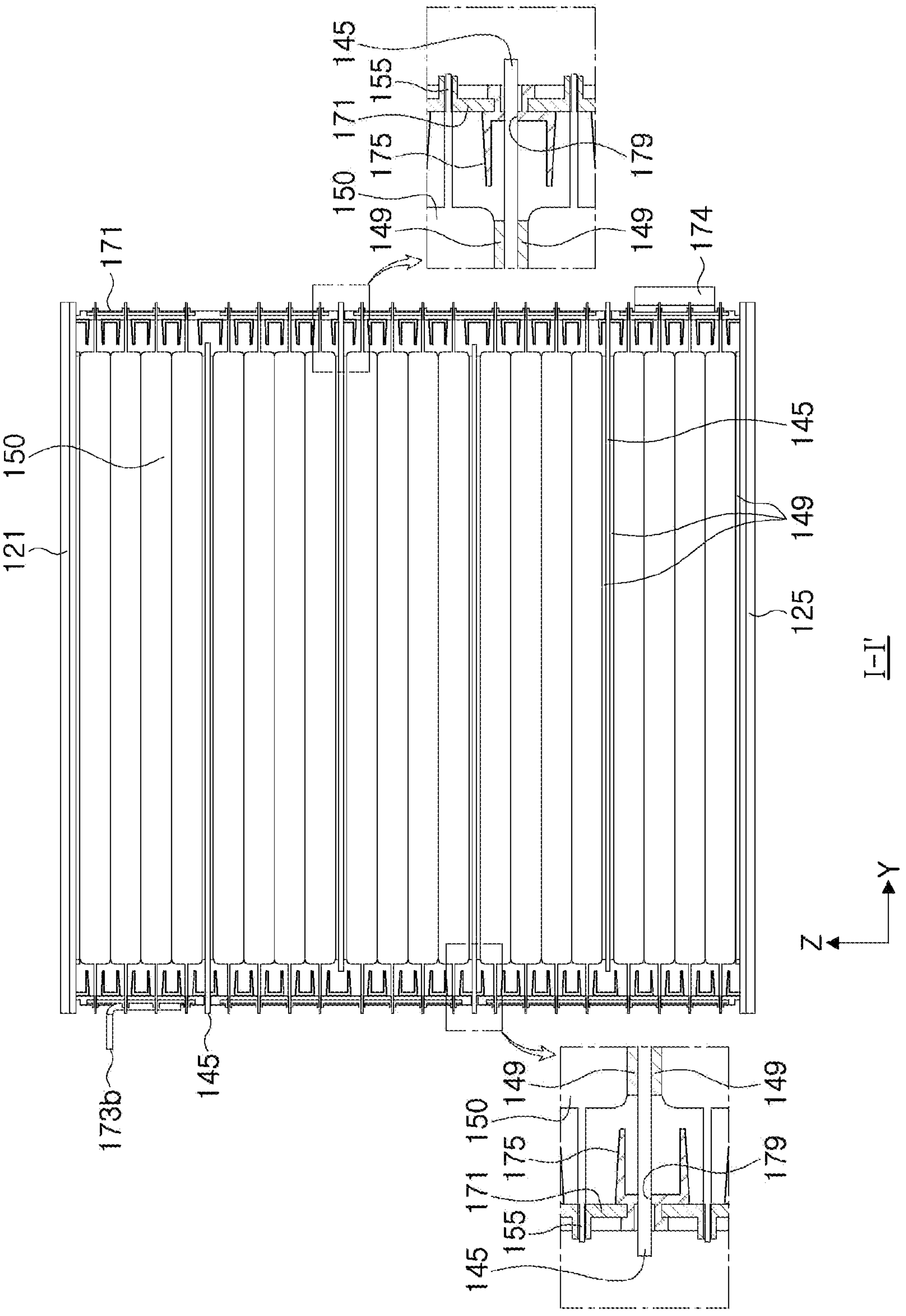
FIG. 6 is a cross-sectional view of FIG. 3, taken along line I-I'.

Next, a configuration of the cell stack 140 and the busbar assembly 170 will be described in more detail with reference to FIGS. 4 to 6. FIG. 4 is a perspective view illustrating a state in which the second stack 140*b* of the cell stack 140 and the second assembly 170*b* of the busbar assembly 170 in the battery module 100 illustrated in FIG. 3 are coupled, FIG. 5 is an exploded perspective view of the cell stack 140 and the busbar assembly 170 illustrated in FIG. 4, and FIG. 6 is a cross-sectional view of FIG. 3, taken along line I-I'. A configuration of the first stack 140*a* may correspond to a configuration of the second stack 140*b*, and a configuration of the first assembly 170*a* may correspond to a configuration of the second assembly 170*b*. Therefore, descriptions of the second stack 140*b* and the second assembly 170*b* illustrated in FIGS. 4 and 5 may be also applicable to the first stack 140*a* and the first assembly 170*a*. In consideration of this point, the cell stack 140 and the busbar assembly 170 will be described based on the second stack 140*b* and the second assembly 170*b*.

The cell stack 140 may be formed by stacking a plurality of battery cells 150. The plurality of battery cells 150 may extend in a second direction Y and may be stacked in a third direction Z, to form the cell stack 140. In this case, the battery cells 150 may be stacked in a laid state. For example, the cell stack 140 may be stacked in a state in which a wide surface of the battery cell 150 faces in a direction of gravity. The battery cell 150 may have a structure in which the electrode leads 155 are respectively installed at both ends in the second direction Y.

The heat insulating member 145 may be installed between at least a portion of the battery cells 150. The heat insulating member 145 may block propagation of flame or high-temperature thermal energy between adjacent battery cells 150, to prevent a chain ignition phenomenon from occurring in the cell stack 140. To this end, the heat insulating member 145 may include a material having at least one property of flame retardancy, heat resistance, heat insulation, or insulation. In this case, heat resistance may mean a property that does not melt and does not change a shape thereof, even at a temperature of 300 degrees Celsius or more, and heat insulation may mean a property having a thermal conductivity of 1.0 W/mK or less. Flame retardancy may mean a property of preventing or inhibiting self-combustion when a fire source is removed, and, for example, having a grade of V-0 or higher in UL94 V Test. Insulation may mean a property that it may be difficult to transmit electricity, and, for example, may mean a material belonging to a comparative tracking index (CTI) II group of 400V or higher in a 400V battery pack (or module) system.

For example, the heat insulating member 145 may include at least some materials selected from mica, silica, silicate, graphite, alumina, ceramic wool, and aerogel, which can prevent heat and/or flame propagation. The material of the heat insulating member 145 is not limited thereto, and a variety of known materials may be used, if they maintain a shape thereof in a thermal runaway situation of the battery cell 150 and prevent propagation of heat or flame to other adjacent battery cells 150. In addition, the heat insulating member 145 may be formed as a heat insulating sheet, but may also be formed as a heat insulating pad.

In addition, the heat insulating member 145 may extend between the busbars 171 through the busbar support member 175. To this end, a heat insulating member passing hole 179 through which the heat insulating member 145 passes may be formed in the busbar support member 175. In addition, the heat insulating member 145 may include an extension portion 146 passing through the heat insulating member passing hole 179 to extend between the busbars 171. A width of the extension portion 146 may be narrower than a width of a body portion of the heat insulating member 145, based on the first direction X.

The busbar 171 may be disposed to be spaced apart from the busbar support member 175 in the third direction Z, and the extension portion 146 of the heat insulating member 145 may extend in the second direction Y, to be located between the busbars 171. For example, the heat insulating member 145 may be located between adjacent busbars 171. A heat resistance temperature of the heat insulating member 145 may be higher than a melting temperature of the busbar support member 175. Thereby, the heat insulating member 145 located between the busbars 171 may prevent a short circuit between the busbars 171 in a thermal runaway situation.

Specifically, when a thermal runaway phenomenon occurs in the battery cells 150 included in the cell stack 140, high-temperature thermal energy, gas, or flame may be generated in the cell stack 140. Therefore, a busbar assembly 170 adjacent to the cell stack 140 may be also exposed to a high-temperature environment. When a temperature of the busbar assembly 170 rises above a certain level, there may be a risk that a material forming the busbar support member 175 is deformed. For example, when the busbar support member 175 includes a material that may be deformed at a high temperature of 200 degrees Celsius or more, and the battery cell 150 ignites, the busbar support member 175 may melt and may not structurally support the busbar 171. In this case, the adjacent busbars 171 may come into contact with each other to cause an electrical short, which may cause a chain ignition of the cell stack 140. In particular, when the busbars 171 are arranged side by side in the third direction Z, which may be the direction of gravity, in the battery module 100, the busbars 171 may flow downwardly in the third direction Z, which may be the direction of gravity, according to collapse of the busbar support member 175, to increase a risk of a short circuit between the busbars 171. In an embodiment of the present disclosure, since the heat insulating member 145 may be configured to be located between the busbars 171, and a heat resistance temperature of the heat insulating member 145 may be higher than a melting temperature of the busbar support member 175, a short circuit between the busbars 171 may be prevented even in a high temperature environment such as a thermal runaway situation or the like.

At least one compressible pad 149 may be installed between at least some of the battery cells 150. Since the compressible pad 149 may be compressed and elastically deformed when a specific battery cell 150 is expanded, expansion of an entire volume of the cell stack 140 may be suppressed. To this end, the compressible pad 149 may be formed of a polyurethane material, but a material or a structure thereof is not limited thereto. The compressible pad 149 may have a size corresponding to a wide surface of the battery cell 150, but the size may be variously changed.

The compressible pad 149 may be installed to contact the heat insulating member 145. The compressible pad 149 may be separated from the heat insulating member 145, but the compressible pad 149 and the heat insulating member 145 may be integrated. In addition, the compressible pad 149 may be disposed on both surfaces of the heat insulating member 145, as illustrated in FIGS. 5 and 6, but may be disposed only on one side of both surfaces of the heat insulating member 145.

The compressible pad 149 may be installed separately from the heat insulating member 145. For example, the compressible pad 149 may be installed outside uppermost and/or lowermost battery cells 150 among the battery cells 150. In this case, the compressible pad 149 may be located between the battery cell 150 and the first plate 121 (see FIG. 9A) or between the battery cell 150 and the second plate 125 (see FIG. 9A). An installation position and the number of the heat insulating member 145 and the compressible pad 149 may be variously changed. For example, only the compressible pad 149 may be installed between the battery cells 150, and only the heat insulating member 145 may be installed on a different portion of the battery cells 150.

The busbar assembly 170 may include a plurality of busbars 171 to which the electrode lead 155 of the battery cell 150 is electrically connected, and a busbar support member 175 for supporting the plurality of busbars 171. The busbar 171 may have a coupling hole 172 to which the electrode leads 155 may be connected. The busbars 171 may be installed on a seating portion 178 formed on the busbar support member 175. An electrode lead passage hole **178*a* through which the electrode lead 155 passes may be formed in the seating portion 178. In addition, a heat insulating member passing hole 179 through which the heat insulating member 145 passes, a vent hole 177 for discharging gas, an assembly hole P3 used for coupling the busbar support member 175 and the partition member 128, and a coupling hole P4 used for coupling the busbar support member 175 and the side plate 131 may be formed on the busbar support member 175. In addition, a sensor installation hole SH for installing a temperature sensing module may be formed in the busbar support member 175. The temperature sensing module may extend to the inside of the busbar support member 175 through the sensor installation hole SH, and thus may sense a temperature of the battery cell 150. In a battery module 100 having an I-shaped frame, although there is a limitation in an installation space of the sensing module, there may be an advantage in that the sensor installation hole SH is formed in the busbar support member 175** to facilitate installation of the temperature sensing module.

The battery cell 150 may have a structure in which electrode leads 155 are respectively installed at both ends in the second direction Y. Therefore, the busbar assembly 170 may be disposed on both sides of the cell stack 140 in the second direction Y, respectively. For example, a second front assembly **170*b*-1 and a second rear assembly 170*b*-2 may be respectively disposed at both ends of the second stack 140*b* in the cell stack 140. The second front assembly 170*b*-1 may be located on a first end of the second stack 140*b*, and the second rear assembly 170*b*-2 may be located on a second end of the second stack 140*b***.

The second front assembly **170*b*-1 may include a second front busbar 171*b*-1 and a second front support member 175*b*-1. The second front busbar 171*b*-1 may include a second electrode terminal 173*b* for electrical connection with the outside. The second rear assembly 170*b*-2 may include a second rear busbar 171*b*-2 and a second rear support member 175*b*-2**.

The second assembly **170*b* may include a second connection portion 176*b* connected to the first connection portion 176*a* (see FIG. 2) of the first assembly 170*a*. The second connection portion 176*b* may have a shape in which a groove P1 and a tongue P2 are repeated, and the first connection portion 176*a* in FIG. 2 may also correspond to the second connection portion 176*b*. A specific configuration of the connection portion 176 will be described later with reference to FIGS. 14A and 14B. Reference numeral 174 not described in FIG. 6 denotes a bridge busbar 174, which will be described later with reference to FIGS. 14A to 15**.

Figure 7:
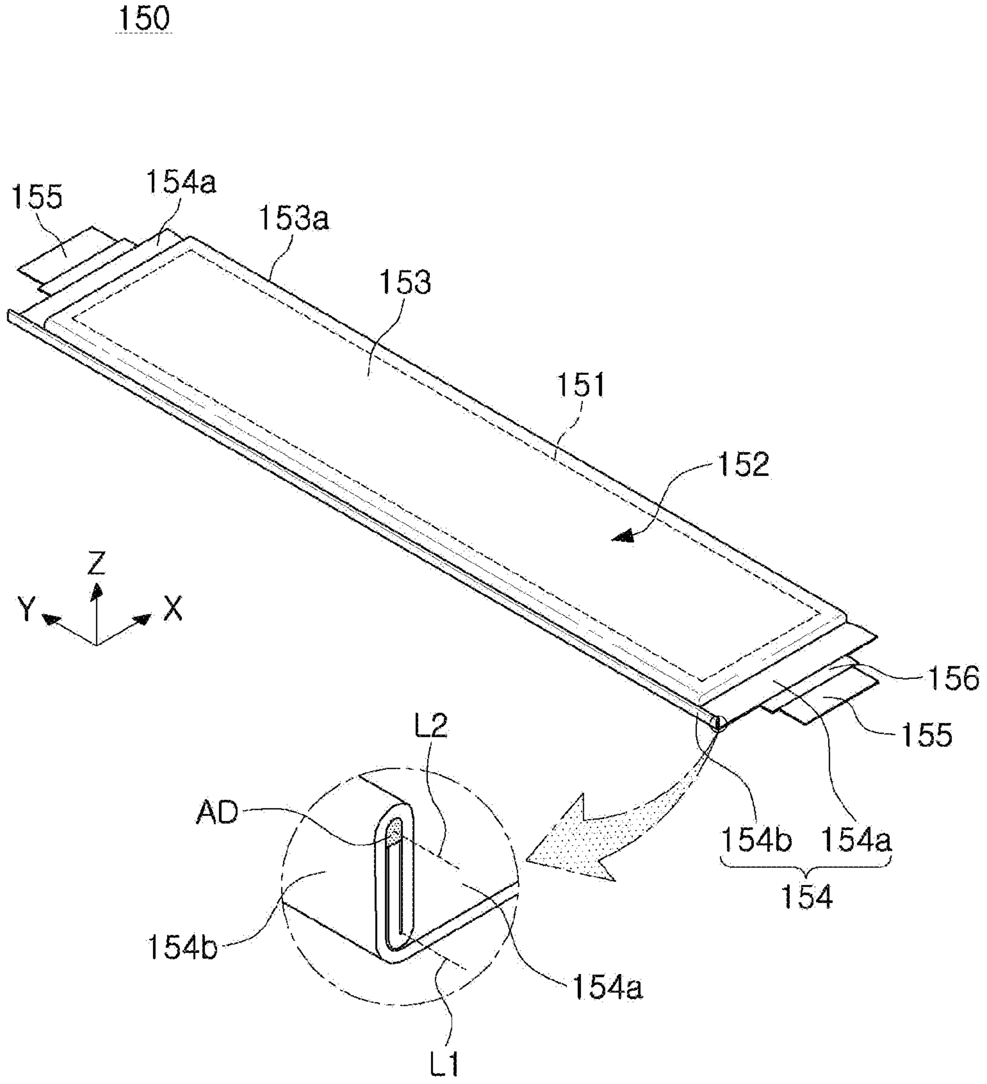
FIG. 7 is a perspective view of the battery cell illustrated in FIG. 5.

FIG. 7 is a perspective view of the battery cell 150 illustrated in FIG. 5.

A battery cell 150 according to an embodiment of the present disclosure may be configured as a pouch-type secondary battery. In an embodiment of the present disclosure, a battery cell 150 is not limited to a pouch-type secondary battery. For example, the battery cell 150 may be configured as a prismatic can-type secondary battery, or may have a configuration in which a plurality of pouch-type secondary batteries are grouped to form a bundle. For convenience of description, the pouch-type secondary battery will be described as an example of the battery cell 150 according to an embodiment of the present disclosure.

The battery cell 150 may be divided into a cell body portion 153 and a sealing portion 154.

The cell body portion 153 may provide an internal space in which an electrode assembly 151 and an electrolyte are accommodated. The electrode assembly 151 may include a plurality of electrode plates and a plurality of electrode tabs, and may be accommodated in a pouch 152. An electrode plate may include a positive electrode plate and a negative electrode plate. The electrode assembly 151 may have a form in which the positive electrode plate and the negative electrode plate are stacked with a separator interposed therebetween, with a wide surface of the positive electrode plate and a wide surface of the negative electrode plate opposing each other. An electrode tab may be disposed on a plurality of positive electrode plates and a plurality of negative electrode plates, respectively. Electrode tabs having the same polarity may be in contact with each other, to be connected to electrode leads 155 having the same polarity.

The sealing portion 154 may be bonded to at least a portion of a circumference of the cell body portion 153 to form a sealed space in the pouch 152. The sealing portion 154 may be formed to have a flange shape extending outwardly from the cell body portion 153 formed in a container shape, and may be disposed along an exterior of the cell body portion 153. A heat-sealing method may be used for bonding the pouch 152, to form the sealing portion 154, but the present disclosure is not limited thereto.

In an embodiment, the sealing portion 154 may be divided into a first sealing portion **154*a* formed in a portion on which the electrode lead 155 is disposed, and a second sealing portion 154*b* formed in a portion on which the electrode lead 155** is not disposed.

The pouch 152 may be formed to have a container shape to provide an internal space in which the electrode assembly and the electrolyte are accommodated. The pouch 152 may be prepared by forming a single sheet of casing. More specifically, after preparing by forming one or two accommodating portions on one sheet of casing, the accommodating portions may form one space (e.g., the cell body portion 153).

The cell body portion 153 may be formed to have a tetragonal shape. The sealing portion 154 formed by bonding the casing may be disposed on the exterior the cell body portion 153. It may not be necessary to form the sealing portion 154 on a surface on which the casing is folded. Therefore, in the present embodiment, the sealing portion 154 may be disposed on only three surfaces among the exterior of the cell body portion 153, and a contact surface **153*a* on which the sealing portion 154 is not disposed may be formed on any one surface of the exterior of the cell body portion 153**.

In an embodiment, the electrode leads 155 may be disposed on both sides of the cell body portion 153 to face in opposite directions. In this case, the sealing portion 154 may include two first sealing portions **154*a* in which electrode leads 155 are disposed, and one second sealing portion 154*b* in which the electrode lead 155** is not disposed.

An insulating film 156 may be disposed between the pouch 152 and the electrode lead 155 in the first sealing portion **154*a*. The insulating film 156 may function to increase a sealing degree and to secure an insulating state, at the same time, in a position in which the electrode lead 155 is lead out. The insulating film 156 may have a shape in which a portion thereof is exposed to the outside of the pouch 152**.

In an embodiment, to increase bonding reliability of the sealing portion 154 and minimize an area of the sealing portion 154, a portion of the sealing portion 154 on which the electrode lead 155 is not disposed may be formed to have a shape folded at least once. The second sealing portion **154*b* may have a shape folded twice. For example, the second sealing portion 154*b* may be folded by 180° along a first bending line L1, and may then be folded again along a second bending line L2. In this case, an internal space of the second sealing portion 154*b* may be filled with an adhesive member AD, and the second sealing portion 154*b*** may maintain a shape folded twice by the adhesive member AD. The adhesive member AD may be formed as an adhesive having high thermal conductivity. For example, the adhesive member AD may be formed of epoxy or silicone, but the present disclosure is not limited thereto.

In an embodiment of the present disclosure, a pouch 152 is not limited to a structure in which a sealing portion 154 is formed on three sides by folding a sheet of casing, as illustrated in FIG. 7. For example, a cell body portion 153 may be formed by overlapping two casings, and a sealing portion 154 may be formed on all four surfaces of the cell body portion 153.

In the battery cell 150 illustrated in FIG. 7, the two electrode leads 155 are illustrated to be disposed on both sides of the cell body portion 153 to face in opposite directions, but two electrode leads 155 may be disposed on either side.

Figure 8:
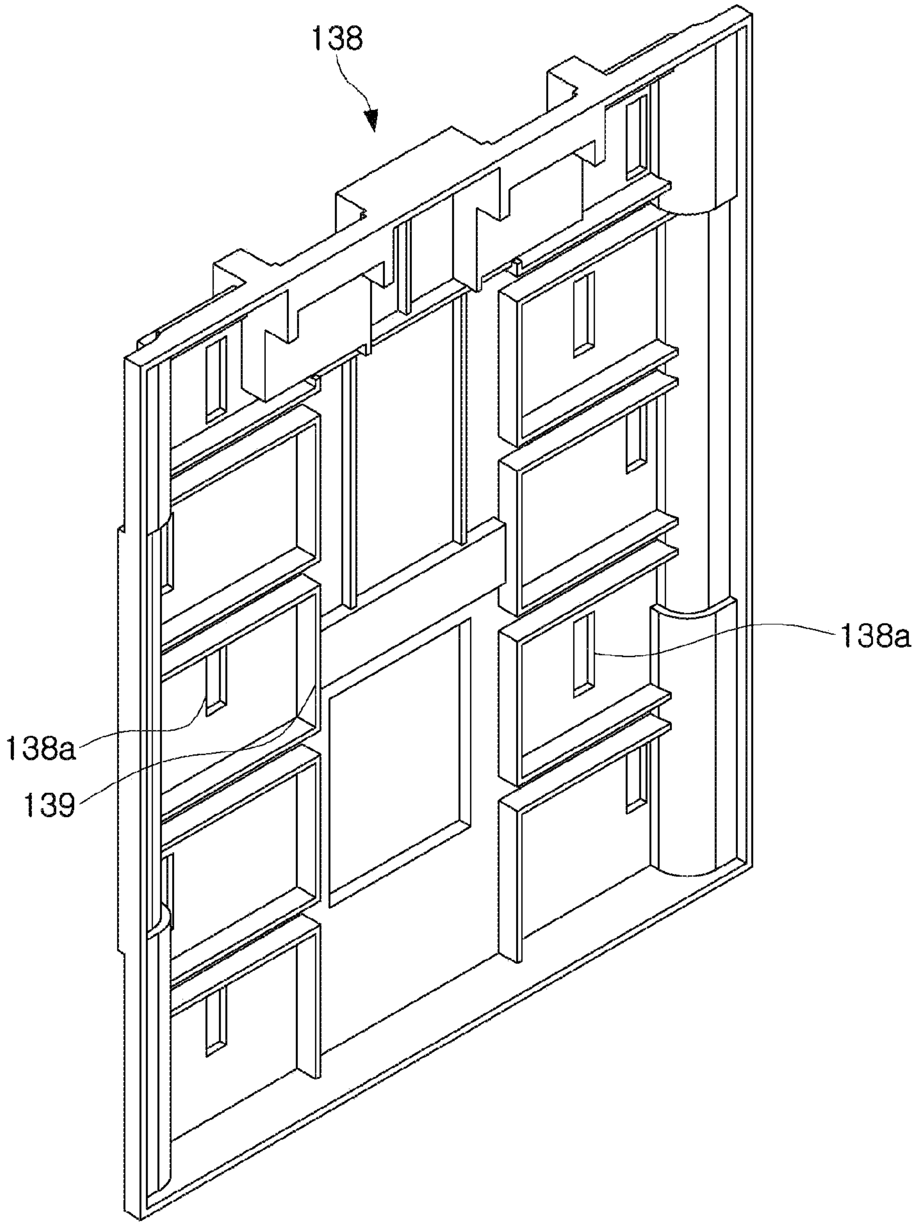
FIG. 8 is a perspective view illustrating a rear surface of an insulating member.

FIG. 8 is a perspective view illustrating a rear surface of an insulating member 138.

An insulating member 138 may be located between an end plate 135 and a busbar assembly 170 to insulate between a busbar 171 and the end plate 135. To this end, the insulating member 138 may be formed of an electrically insulating material. A gas flow port 138*a* may be formed in the insulating member 138 such that gas discharged through a vent hole 177 of the busbar assembly 170 is discharged through a gas outlet 136 of the end plate 135. The gas flow port 138*a* may be formed in a position corresponding to the gas outlet 136 of the end plate 135.

In addition, the insulating member 138 may include a flow blocking wall 139 formed around the gas flow port. The flow blocking wall 139 may restrict gas discharged through the vent hole 177 of the busbar assembly 170 from flowing in any direction in a housing 110. For example, the flow blocking wall 139 may guide gas discharged through the vent hole 177 of the busbar assembly 170 to be discharged into the gas flow port 138*a*.

The flow blocking wall 139 may restrict discharging a flame or gas generated in a cell stack 140 through a specific vent hole 177 of the busbar assembly 170 and moving then the same back through another vent hole 177 into the cell stack 140. To this end, the flow blocking wall 139 may have a shape surrounding the vent hole 177 of the busbar assembly 170. Referring to FIG. 6, a plurality of battery cells 150 (four battery cells in FIG. 6) may be configured as one parallel connection group, and the cell stack 140 may have a configuration including a plurality of parallel connection groups. In this case, the flow blocking wall 139 may be disposed to correspond to each of the parallel connection groups.

In an embodiment of the present disclosure, when a flame or gas is generated due to ignition or temperature rise in some battery cells 150 of the cell stack 140 through a configuration of the flow barrier wall 139, propagation of the flame or gas to the other battery cells 150 may be reduced.

Next, a method of coupling a cell stack 140 between a first frame 120*a* and a second frame 120*b* will be described with reference to FIGS. 9A to 12B.

Figure 9A:
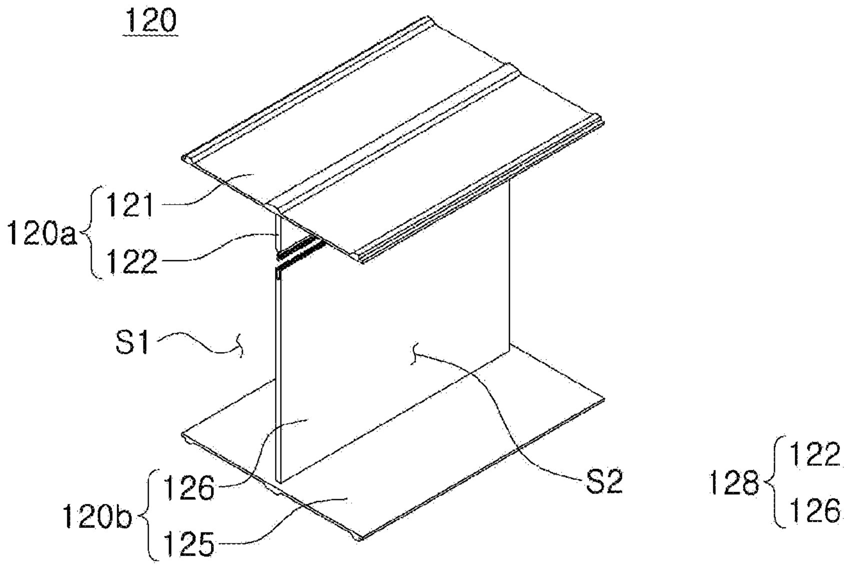
FIGS. 9A to 9C are perspective views sequentially illustrating assembling a cell stack on a frame member.
Figure 9B:
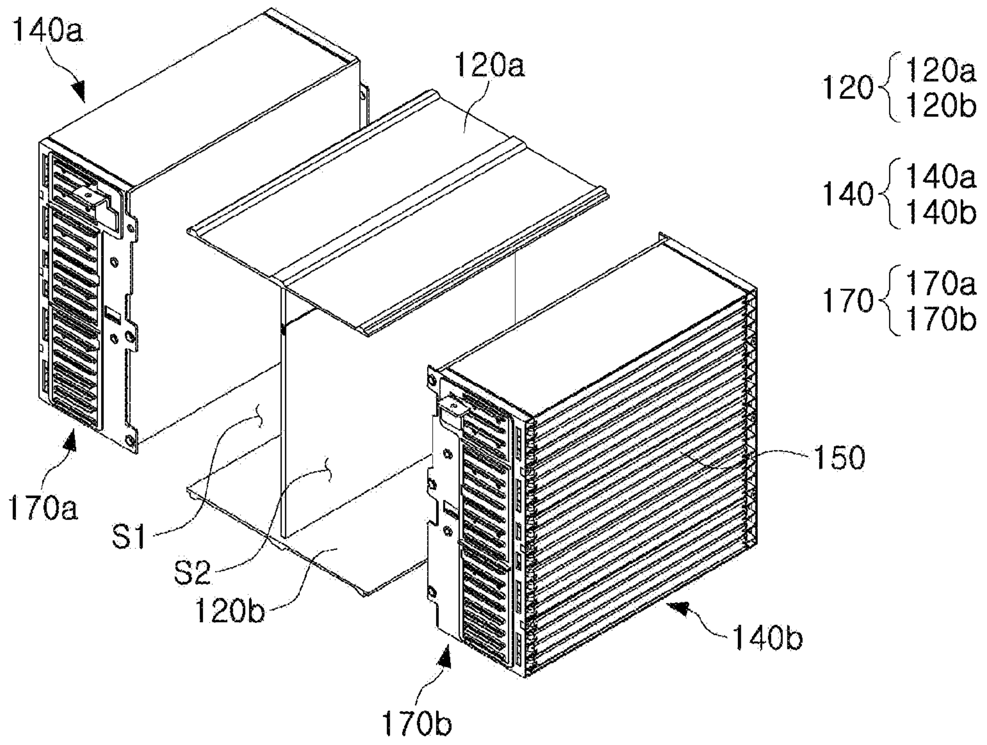
Figure 9C:
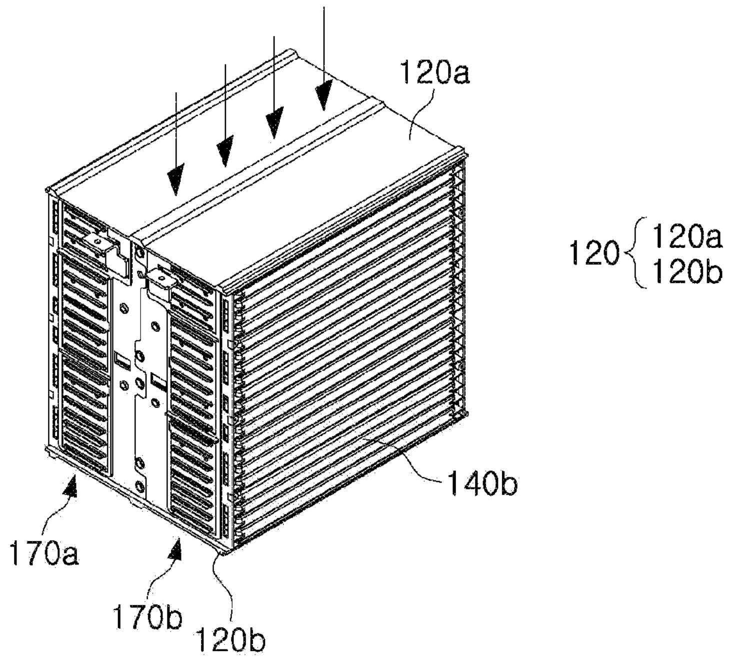
Figures 10A, 10B, 10C:
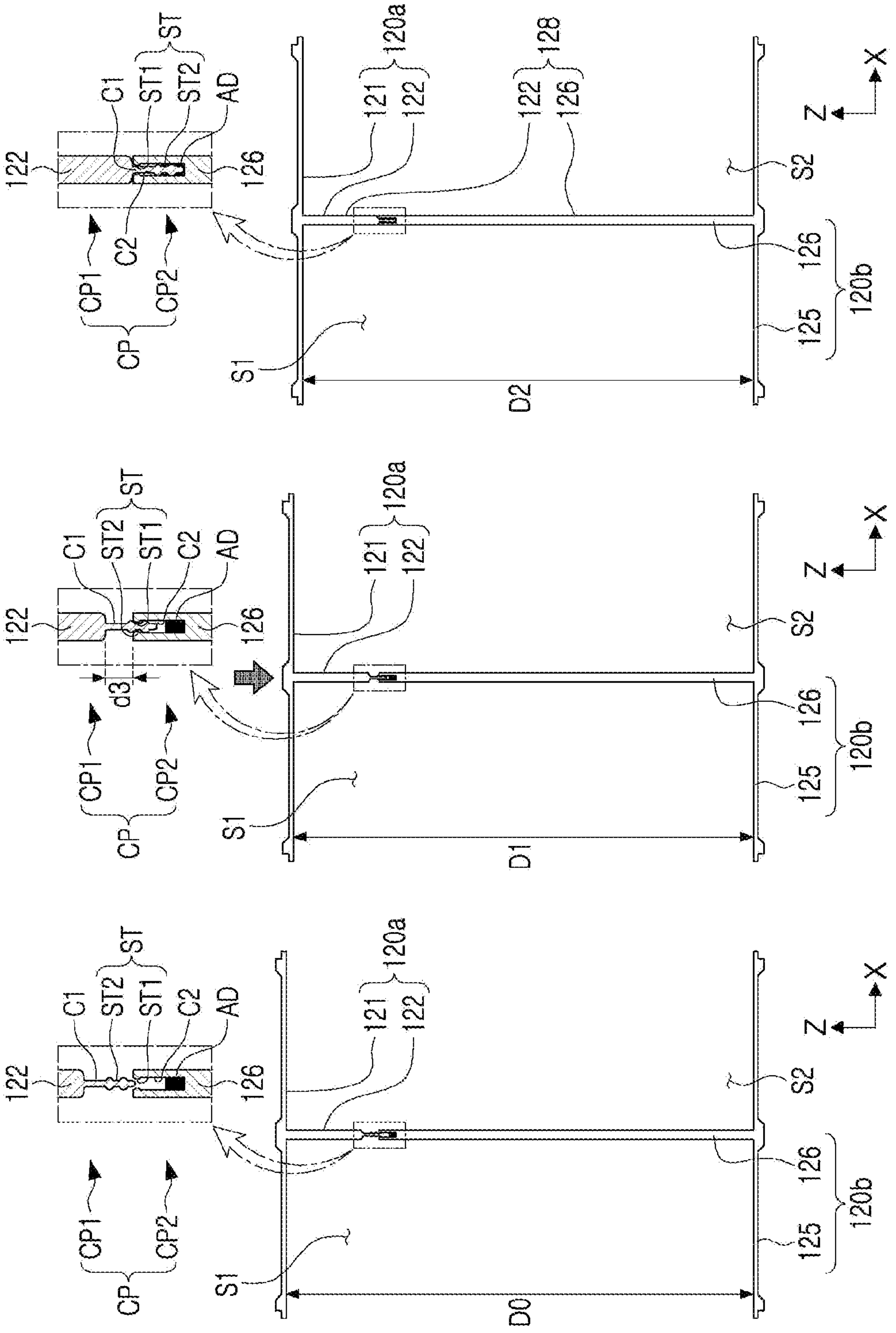
FIGS. 10A to 10C are cross-sectional views illustrating the first frame and the second frame to be coupled in assembling the cell stack to the frame member, corresponding to FIGS. 9A to 9C, respectively.

FIGS. 9A to 9C are perspective views sequentially illustrating assembling a cell stack 140 on a frame member 120, FIG. 9A illustrates a first frame 120*a* and a second frame 120*b* before coupling thereof, FIG. 9B illustrates the first frame 120*a* and the second frame 120*b* in a first coupling position, and FIG. 9C illustrates the first frame 120*a* and the second frame 120*b* in a second coupling position. In addition, FIGS. 10A to 10C are cross-sectional views illustrating the first frame 120*a* and the second frame 120*b* to be coupled in assembling the cell stack 140 to the frame member 120, corresponding to FIGS. 9A to 9C, respectively. FIG. 10A illustrates the first frame 120*a* and the second frame 120*b* before coupling thereof, FIG. 10B illustrates the first frame 120*a* and the second frame 120*b* in a first coupling position, and FIG. 10C illustrates the first frame 120*a* and the second frame 120*b* in a second coupling position. In FIGS. 10A to 10C, the cell stack 140 is excluded to clearly illustrate a coupling state of the frame member 120.

A first frame 120*a* and a second frame 120*b* may have a first coupling position for inserting a cell stack 140 (e.g., 140*a* and 140*b*) into a plurality of accommodation spaces S1 and S2, and a second coupling position, of which a gap between the first frame 120*a* and the second frame 120*b* is narrower than those in the first coupling position.

In addition, the first frame 120*a* and the second frame 120*b* may include a coupling portion CP that may be coupled in a fitting coupling manner, respectively. One of the coupling portion CP of the first frame 120*a* and the second frame 120*b* may be inserted into the other of the coupling portion CP thereof and coupled to each other. The coupling portion CP may be configured such that the first frame 120*a* and the second frame 120*b* have the first coupling position and the second coupling position.

Referring to FIGS. 9A and 10A, a frame member 120 may include a first frame 120*a* and a second frame 120*b*. The first frame 120*a* may include a first plate 121 facing a first surface (an upper surface) of a cell stack (e.g., 140*a* and 140*b* in FIGS. 2 and 9B), and a first extension plate 122 extending from the first plate 121 to face a second surface (a side surface of the cell stack), perpendicular to the first surface. The second frame 120*b* may include a second plate 125 spaced apart from the first plate 121 and a second extension plate 126 extending from the second plate 125 and facing the second surface. Since FIG. 9A illustrates the first frame 120*a* and the second frame 120*b* before coupling thereof, a gap D0 between the first plate 121 and the second plate 125 before the coupling may be greater than or equal to a sum of a height of the first extension plate 122 and a height of the second extension plate 126.

The first frame 120*a* and the second frame 120*b* may have a T-shaped cross-section, respectively, and may be combined with each other to form an I-shaped (a laid H-shaped) frame. The first extension plate 122 and the second extension plate 126 may correspond to a partition member 128. The first frame 120*a* and the second frame 120*b* may form a first accommodation space S1 and a second accommodation space S2, on both sides of the partition member 128 in a coupled state. An accommodation space S (e.g., S1 and S2) may be defined by an upper surface, a lower surface, and one side surface.

The first frame 120*a* and the second frame 120*b* may include a coupling portion CP that may be coupled in a fitting coupling manner, respectively. The coupling portion CP of the first frame 120*a* and the second frame 120*b* may be coupled to each other. As an example, the coupling portion CP may include a first coupling portion CP1 included in the first frame 120*a* and a second coupling portion CP2 included in the second frame 120*b*. In this case, one of the first coupling portion CP1 and the second coupling portion CP2 may include a tongue portion C1, and the other thereof may include a groove portion C2 into which the tongue portion C1 is inserted or forcedly inserted and coupled to each other. FIG. 10A illustrates a configuration in which the first coupling portion CP1 is formed of the tongue portion C1 extending in the third direction Z and the second coupling portion CP2 is formed of the groove portion C2, but a configuration opposite thereto is also possible.

Referring to FIGS. 9B and 10B, the first frame 120*a* and the second frame 120*b* may be coupled to each other to have a first coupling position. The first coupling position may be a state in which the first frame 120*a* and the second frame 120*b* may be temporarily coupled to insert the cell stack 140 into the plurality of accommodation spaces S1 and S2. The cell stack 140 may be inserted into each of the accommodation spaces S1 and S2 in the first coupling position.

To allow the cell stack 140 to be easily inserted into the accommodation spaces S1 and S2, a first gap D1 between the first plate 121 and the second plate 125 in the first coupling position may be greater than a height of the cell stack 140 (a distance thereof in the third direction Z). Also, in the first coupling position, the tongue portion C1 may not be completely inserted into the groove portion C2, and a portion of the tongue portion C1 may be exposed from the groove portion C2 by a predetermined length d3.

The cell stack 140 may be inserted into the accommodation spaces S1 and S2 formed by the first frame 120*a* and the second frame 120*b* in the first coupling position. In this case, the cell stack 140 and a busbar assembly 170 may be inserted into the accommodation spaces S1 and S2 in a coupled state. A first stack 140*a* and a first assembly 170*a* may be electrically connected in a coupled state to form a first unit (140*a* and 170*a*), and a second stack 140*b* and a second assembly 170*b* may be electrically connected in a coupled state to form a second unit (140*b* and 170*b*). The first unit (140*a* and 170*a*) and the second unit (140*b* and 170*b*) may be respectively disposed in the plurality of accommodation spaces S1 and S2 of the frame member 120. For example, the first unit (140*a* and 170*a*) may be inserted into the first accommodation space S1 in a state in which the first stack 140*a* and the first assembly 170*a* are coupled, and the second unit (140*b* and 170*b*) may be inserted into the second accommodation space S2 in a state in which the second stack 140*b* and the second assembly 170*b* are coupled. In an embodiment of the present disclosure, after the cell stack 140 is respectively inserted into the accommodation spaces S1 and S2, the busbar assembly 170 may be coupled to the cell stack 140 inserted into the accommodation spaces S1 and S2.

The first coupling portion CP1 and the second coupling portion CP2 may include a stopping member ST for maintaining the coupled state of the first coupling portion CP1 and the second coupling portion CP2 in the first coupling position. The stopping member ST may prevent the first frame 120*a* and the second frame 120*b* from being separated, when the cell stack 140 is inserted in the first coupling position. The stopping member ST may include a protrusion ST1 located on one of an inner circumferential surface of the groove portion C2 and an outer circumferential surface of the tongue portion C1, and a recess ST2 located on the other thereof. The protrusion ST1 and the recess ST2 may be inserted or forcedly inserted and coupled to each other each other, to function such that the first frame 120*a* and the second frame 120*b* maintain a second coupling position.

Referring to FIGS. 10A to 10C, the protrusion ST1 and the recess ST2 are illustrated to be integrally formed on the inner circumferential surface of the groove portion C2 and the outer circumferential surface of the tongue portion C1, respectively. The protrusion ST1 and the recess ST2 may be separately manufactured and then attached to the inner circumferential surface of the groove portion C2 and/or the outer circumferential surface of the tongue portion C1. In addition, if the first frame 120*a* and the second frame 120*b* may maintain the coupling position, when the cell stack 140 is inserted in the first coupling position, the installation number and location of the protrusions ST1 and the recesses ST2 may also be changed in various manners.

Referring to FIGS. 9C and 10C, the first frame 120*a* and the second frame 120*b* may be coupled to each other to have a second coupling position. The second coupling position may be a state in which a gap between the first frame 120*a* and the second frame 120*b* is narrower than those in the first coupling position in a state in which the cell stack 140 is inserted into the accommodation space S (e.g., S1 and S2). A second gap D2 between the first plate 121 and the second plate 125 in the second coupling position may be less than the first gap D1. In the second coupling position, the tongue portion C1 may be maximally inserted into an inner space of the groove portion C2.

A height of the cell stack 140 in the first coupling position may be lower than the first gap D1 between the first plate 121 and the second plate 125. Therefore, in the first coupling position, the cell stack 140 may not be pressed by the first plate 121 and the second plate 125. In the second coupling position, the first frame 120*a* and the second frame 120*b* may press the cell stack 140 in a direction in which the partition member 128 extends (e.g., in the third direction). For example, in the second coupling position, the first frame 120*a* and the second frame 120*b* may press the cell stack 140 in a direction moving from the first coupling position to the second coupling position. Also, in the second coupling position, the first frame 120*a* and the second frame 120*b* may have a state in which the cell stack 140 is pressed in a direction in which battery cells 150 are stacked. The plurality of battery cells 150 may be disposed horizontally and stacked vertically between the first frame 120*a* and the second frame 120*b*. Therefore, in the second coupling position, the first frame 120*a* and the second frame 120*b* may press the cell stack 140 in the vertical direction Z.

Since the battery cells 150 are stacked, the cell stack 140 may have an assembly tolerance in the height direction Z in the stacked state. In particular, since the cell stack 140 may include a compressible pad 149 (see FIG. 5), which is elastically deformable, the cell stack 140 may increase the assembly tolerance (e.g., in the height direction Z) according to a state of the compressible pad 149 (e.g., around 5 mm). When assembly tolerance is maintained, dimensional defects or quality defects may occur in a module unit. In addition, as the number of stacked battery cells 150 increases, the assembly tolerance may further increase. Therefore, there may be a limit in increasing height of the cell stack 140. According to an embodiment, since the assembly tolerance of the cell stack 140 may be absorbed by allowing the cell stack 140 to have a pressurized state in the second coupling position, a degree of design freedom such as an increase in number of stacked battery cells 150, an increase in height of the cell stack 140, or the like may be improved.

An adhesive member AD for fixing a position of the tongue portion C1 in the second coupling position may be disposed in the groove portion C2. The adhesive member AD may be adhered between the first coupling portion CP1 and the second coupling portion CP2 in the second coupling position. A sufficient amount of the adhesive member AD may be applied to the groove portion C2 to maintain a strong coupling state. For example, the adhesive member AD may have a sufficient amount to contact lower and side surfaces of the tongue portion C1.

Figure 11A:
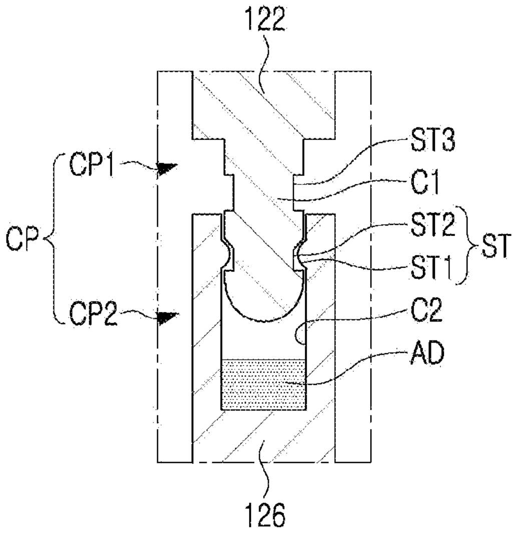
FIGS. 11A and 11B are views illustrating a coupling portion according to another embodiment of the present disclosure.
Figure 11B:
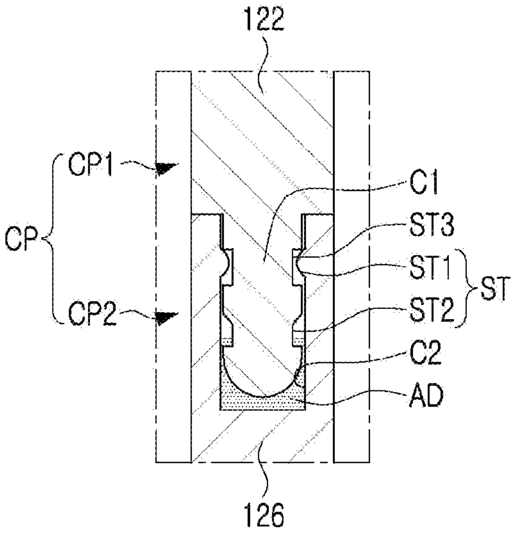

FIGS. 11A and 11B are views illustrating a coupling portion CP according to another embodiment of the present disclosure, FIG. 11A illustrates a first coupling position, and FIG. 11B illustrates a second coupling position.

An embodiment of a coupling portion CP illustrated in FIGS. 11A and 11B may be different from the embodiment illustrated in FIGS. 10A to 10C, only in view of the fact that the coupling portion CP may further include a position fixing member. Therefore, to avoid unnecessary duplication, the description of the same or similar components will be replaced with the description of FIGS. 10A to 10C, and only different components will be described.

A coupling portion CP illustrated in FIGS. 11A and 11B may be configured to further include a position fixing member (ST1 and ST3). The position fixing member (ST1 and ST3) may maintain a coupling state of a first coupling portion CP1 and a second coupling portion CP2 in a second coupling position.

The position fixing member (ST1 and ST3) may restrict movement in a direction in which a first frame 120*a* and a second frame 120*b* are separated from each other in the second coupling position of FIG. 11B. The position fixing member (ST1 and ST3) may include a latching structure or an insertion-coupling structure formed between an inner circumferential surface of a groove portion C2 and an outer circumferential surface of a tongue portion C1. The position fixing member (ST1 and ST3) may be similar to a stopping member ST, and may include a protrusion ST1 formed on one of the inner circumferential surface of the groove portion C2 and the outer circumferential surface of the tongue portion C1, and a recess ST2 located on the other thereof.

Referring to FIGS. 11A and 11B, the position fixing member (ST1 and ST3) may include a recess ST3 formed in the tongue portion C1, and the protrusion ST1 formed in the groove portion C2. In this case, at least some of the position fixing member (ST1 and ST3) may use the stopping member ST. For example, in the embodiment of FIGS. 11A and 11B, the protrusion ST1 formed in the groove portion C2 may be used as the stopping member ST and the position fixing member.

Referring to FIG. 11A, the coupling portion CP may have a structure in which the protrusion ST1 formed in the groove portion C2 is inserted into the recess ST2 formed in the tongue portion C1 in the first coupling position. Therefore, a coupling state of the first coupling portion CP1 and the second coupling portion CP2 may be maintained in the first coupling position.

In addition, as illustrated in FIG. 11B, the coupling portion CP may have a structure in which the protrusion ST1 formed in the groove portion C2 in the second coupling position is inserted into and latched to the recess ST2 formed in the tongue portion C1. Therefore, the first coupling portion CP1 and the second coupling portion CP2 may maintain a coupled state in the second coupling position. For example, the recess ST2 of the first coupling portion CP1 may be latched by the protrusion ST1 of the second coupling portion CP2. Therefore, separation of the first coupling portion CP1 may be limited. In addition, in the second coupling position, the tongue portion C1 and the groove portion C2 may maintain a fixed state by an adhesive member AD.

Figure 12A:
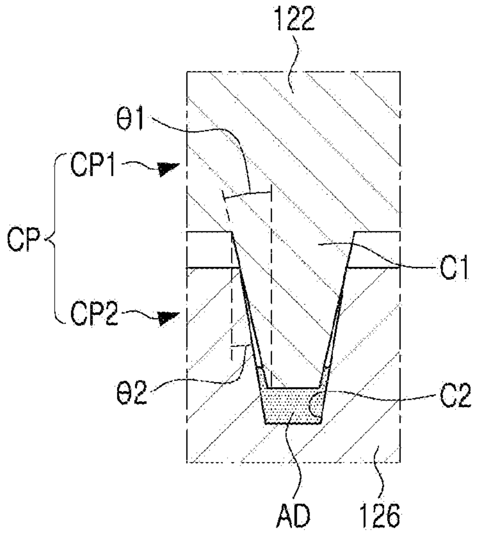
FIGS. 12A and 12B are views illustrating a coupling portion according to another embodiment of the present disclosure.
Figure 12B:
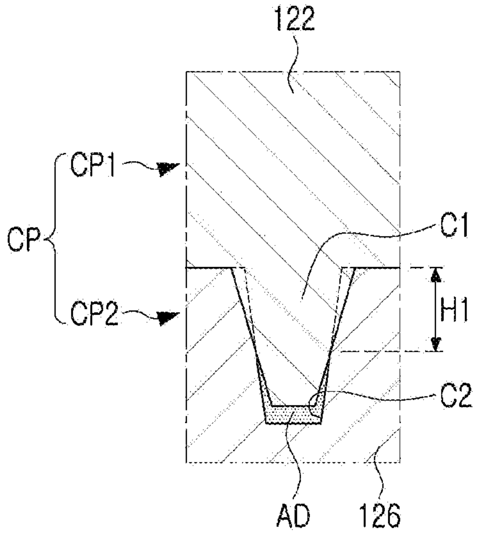

FIGS. 12A and 12B are views illustrating a coupling portion CP according to another embodiment of the present disclosure, FIG. 12A illustrates a first coupling position, and FIG. 12B illustrates a second coupling position.

An embodiment of a coupling portion CP illustrated in FIGS. 12A and 12B may be different from the embodiments illustrated in FIGS. 10A to 11B, in view of the facts that an inclination angle of a tongue portion C1 and an inclination angle of a groove portion C2 may be used to implement a first coupling position and a second coupling position. Therefore, to avoid unnecessary duplication, the description of the same or similar components will be replaced with the description of FIGS. 10A to 10C, and only different components will be described.

A coupling portion CP illustrated in FIGS. 12A and 12B may have a configuration in which a tongue portion C1 is formed in a first coupling portion CP1 and a groove portion C2 is formed in a second coupling portion CP2. Based on a cross-section in a direction in which the tongue portion C1 extends, each of the tongue portion C1 and the groove portion C2 may have a shape in which a width decreases in a direction in which the tongue portion C1 extends.

As illustrated in FIG. 12A, the tongue portion C1 may have a shape in which at least a portion of the tongue portion C1 is exposed to an outside of the groove portion C2 in the first coupling position. For example, the tongue portion C1 may have a width narrowing at a first inclination angle θ1 in a direction in which the tongue portion C1 extends (in the direction of gravity), and the groove portion C2 may have a width narrowing at a second inclination angle θ2, narrower than the first inclination angle θ1, in a direction in which the tongue portion C1 extends. In this case, the width of the tongue portion C1 and the width of the groove portion C2 may be changed due to differences in the inclination angles θ1 and θ2, and the tongue portion C1 in the first coupling position may be inserted into the groove portion C2 to a position having a width, equal to a width of the groove portion C2, in an end portion of the second coupling portion CP2. Therefore, at least a portion of the tongue portion C1 may be exposed to the outside of the groove portion C2 in the first coupling position. In the first coupling position, since the tongue portion C1 may not be completely inserted into the groove portion C2, a free space for inserting a cell stack 140 may be formed.

Referring to FIG. 12B, in the second coupling position, the tongue portion C1 may be forcedly inserted into the groove portion C2. That is, the tongue portion C1 and the groove portion C2 have a state of interference fit. Therefore, in a region corresponding to a depth H1 of the tongue portion C1 to be forcedly inserted into the groove portion C2 in FIG. 12B, an opened end portion of the groove portion C2 may be widened outwardly. In the second coupling position, the tongue portion C1 and the groove portion C2 may be maintained in a fixed state by an adhesive member AD.

In a conventional battery module having an I-shaped frame, since a cell stack is accommodated on both sides of a partition member, an opened end portion of a housing should be widened to insert the cell stack into an accommodation space of the housing. In widening the opened end portion of the housing, stress may be generated in the housing, which may cause breakage or deformation. In addition, in the conventional battery module having an I-shaped frame, there may be a problem that pressing force applied to the cell stack from the housing is not constant.

In an embodiment of the present disclosure, as described with reference to FIGS. 9A to 11B, a frame member 120 may be divided into a first frame 120*a* and a second frame 120*b*, and a gap between the first frame 120*a* and the second frame 120*b*, in the first coupling position in which the cell stack 140 is assembled, may be greater than a height of the cell stack 140. Therefore, problems that the frame member 120 is broken or deformed due to stress generated in the frame member 120 may be solved, as compared to the prior art.

Next, a cooling structure and a thermal runaway preventing structure of the cell stack 140 will be described with reference to FIG. 13.

Figure 13:
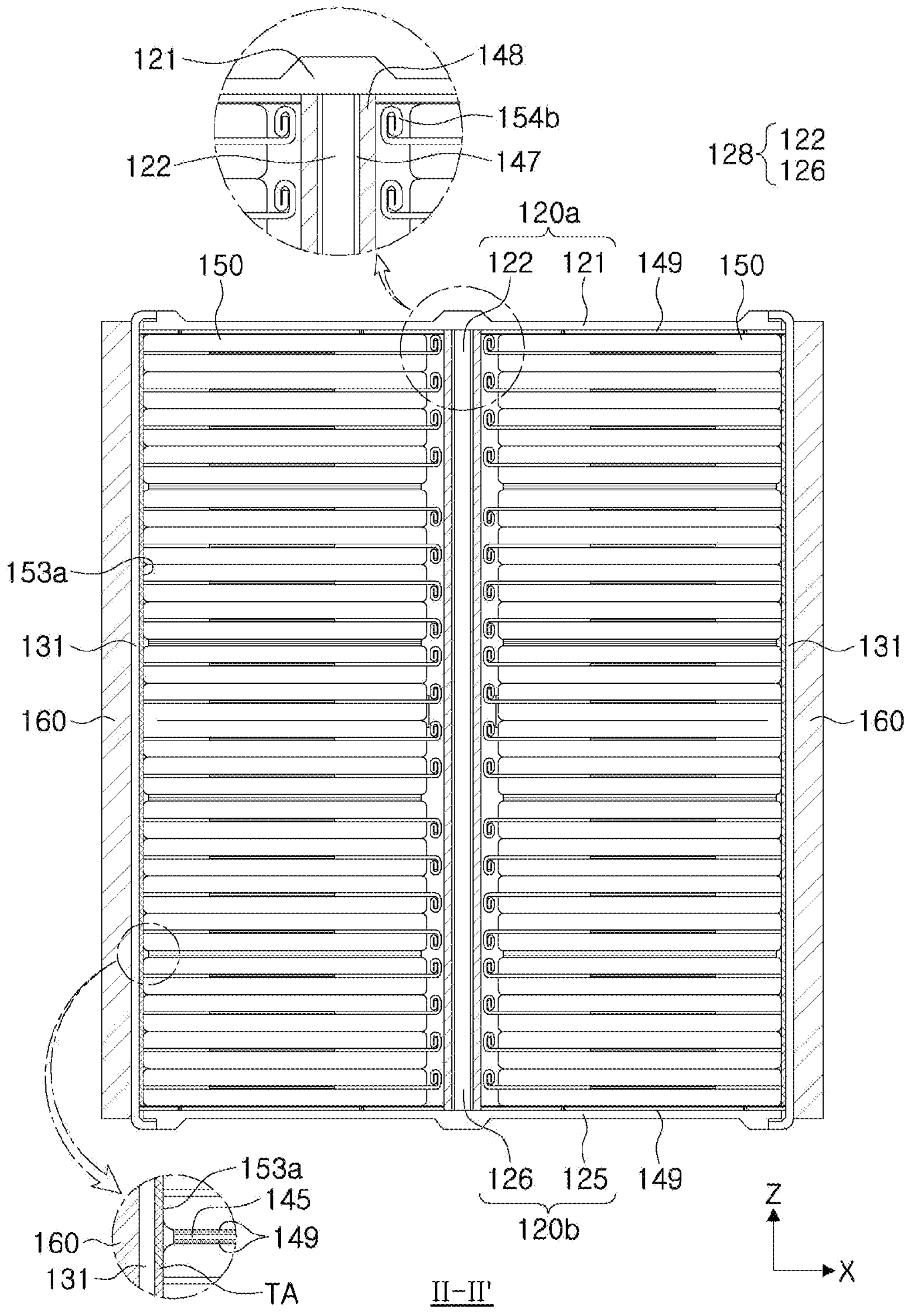
FIG. 13 is a cross-sectional view of FIG. 3, taken along line II-II', further illustrating a cooling member.

FIG. 13 is a cross-sectional view of FIG. 3, taken along line II-II', further illustrating a cooling member 160.

Referring to FIG. 13 together with FIGS. 2 and 3, the cell stack 140 may be accommodated in the accommodation space S (e.g., S1 and S2) in the housing 110. The cell stack 140 may include a plurality of battery cells 150 in a state in which a wide surface thereof faces the third direction Z. The first accommodation space S1 and the second accommodation space S2 in the housing 110 may accommodate the first stack 140*a* and the second stack 140*b*, respectively.

The first stack 140*a* and the second stack 140*b* may have a structure surrounded by the first plate 121 of the first frame 120*a*, the second plate 125 of the second frame 120*b*, the partition member 128 including the first extension plate 122 and the second extension plate 126, and the side plate 131.

The cell stack 140 may be cooled by the side plate 131. In an embodiment, a battery cell 150 may include a pouch-type secondary battery in which the sealing portion 154 (see FIG. 7) is formed on three surfaces as illustrated in FIG. 7. In this case, in the cell stack 140, the contact surface 153*a* on which the sealing portion 154 (see FIG. 7) is not formed in the cell body portion 153 (see FIG. 7) may be disposed to face the side plate 131. In addition, an outer surface of the side plate 131 may be configured to contact a cooling member 160 for heat dissipation. The cooling member 160 may have a flow path through which a refrigerant (including cooling water or air) flows therein. Therefore, heat generated in the battery cell 150 may be transferred to the side plate 131 through the contact surface 153*a*, and may then be discharged externally through the cooling member 160. The cooling member 160 may be attached to the battery module 100 or have a structure integrated with the battery module 100. Alternatively, the cooling member 160 may be installed as a component in a battery pack 200 (see FIG. 16). Also, the cooling member 160 may be configured to be disposed between two battery modules 100. In this case, the cooling member 160 may be configured to contact side plates 131 of adjacent battery modules 100.

A thermally conductive adhesive member TA may be disposed between the contact surface 153*a* of the battery cell 150 and the side plate 131, to improve heat transfer performance between the contact surface 153*a* of the battery cell 150 and the side plate 131. The thermally conductive adhesive member TA may include at least a portion of a thermal grease, a thermal adhesive, a thermally conductive epoxy, or a heat dissipation pad, to facilitate the heat transfer performance, but the present disclosure is not limited thereto.

In a conventional I-shaped frame, cooling or heat dissipation of the cell stack 140 on both sides of the partition member 128 may be performed through one partition member located in a central portion thereof, such that cooling or heat dissipation efficiency may be reduced. Therefore, in the conventional I-shaped frame, it may be difficult to increase the number of battery cells included in the cell stack 140. In an embodiment of the present disclosure, cooling or heat dissipation may be performed through the plurality of side plates 131 outside the cell stack 140. Therefore, cooling or heat dissipation efficiency may be improved and the number of battery cells 150 included in the cell stack 140 may increase.

In addition, in an embodiment of the present disclosure, since the side plate 131 may be fastened to the busbar support member 175 of the busbar assembly 170, a gap between the side plate 131 and the cell stack 140 may be kept constant. For example, a gap between the side plate 131 and the contact surface 153*a* of the battery cell 150 may be constantly maintained.

The thermally conductive adhesive member TA may be disposed between the side plate 131 and the contact surface 153*a* of the battery cell 150. It may be difficult to accurately maintain a thickness of the thermally conductive adhesive member TA disposed between the contact surface 153*a* of the battery cell 150 and the side plate 131, when the battery cells 150 are stacked in a laid state, compared to a case in which the battery cells 150 are stacked in an upright state. In an embodiment of the present disclosure, the thickness of the thermally conductive adhesive member TA may be maintained constant according to coupling between the side plate 131 and the busbar support member 175. Therefore, cooling/heat dissipation performance between the contact surface 153*a* of the battery cell 150 and the side plate 131 may be improved.

The partition heat insulating member 147 may be installed between the cell stack 140 and the partition member 128. The partition heat insulating member 147 may be attached to the cell stack 140, but may also be attached to the partition member 128. The partition heat insulating member 147 may block propagation of flame or high-temperature thermal energy between the cell stacks 140 disposed on both sides of the partition member 128. Therefore, the partition heat insulating member 147 may prevent a chain ignition phenomenon from occurring from one cell stack 140 to another cell stack 140. To this end, the partition heat insulating member 147 may include a material having at least one property of flame retardancy, heat resistance, heat insulation, or insulation, similarly to the heat insulating member 145 disposed between the battery cells 150. In this case, heat resistance may mean a property that does not melt and does not change a shape thereof, even at a temperature of 300 degrees Celsius or more, and heat insulation may mean a property having a thermal conductivity of 1.0 W/mK or less. Flame retardancy may mean a property of preventing or inhibiting self-combustion when a fire source is removed, and, for example, having a grade of V-0 or higher in UL94 V Test. Insulation may mean a property that it may be difficult to transmit electricity, and, for example, may mean a material belonging to a comparative tracking index (CTI) II group of 400V or higher in a 400V battery pack (or module) system.

For example, the partition heat insulating member 147 may include at least some material selected from mica, silica, silicate, graphite, alumina, ceramic wool, and aerogel, which can prevent heat and/or flame propagation. The material of the partition heat insulating member 147 is not limited thereto, and a variety of known materials may be used, if they maintain its shape in a thermal runaway situation of the battery cell 150 and prevent propagation of heat or flame to other adjacent cell stack 140. In addition, the partition heat insulating member 147 may be formed as a heat insulating sheet, but may also be formed as a heat insulating pad.

An insulating pad 148 may be installed between the partition heat insulating member 147 and the cell stack 140. The insulating pad 148 may electrically insulate between the battery cell 150 of the cell stack 140 and the partition member 128.

In a conventional I-shaped frame, since cooling may be performed by a partition member located in a central portion thereof, when thermal runaway occurs in a cell stack on a first side of the partition member, there was a problem that thermal runaway easily occurs in the cell stack on a second side through the partition member. In an embodiment of the present disclosure, since the partition heat insulating member 147 may be installed between the cell stack 140 and the partition member 128, a thermal runaway phenomenon between the cell stacks 140 may be blocked.

As described with reference to FIGS. 4 to 6, a heat insulating member 145 may be installed between the battery cells 150, and a compressible pad 149 may be additionally installed.

Next, the busbar assembly 170 will be described with reference to FIGS. 14A and 14B.

Figure 14B:
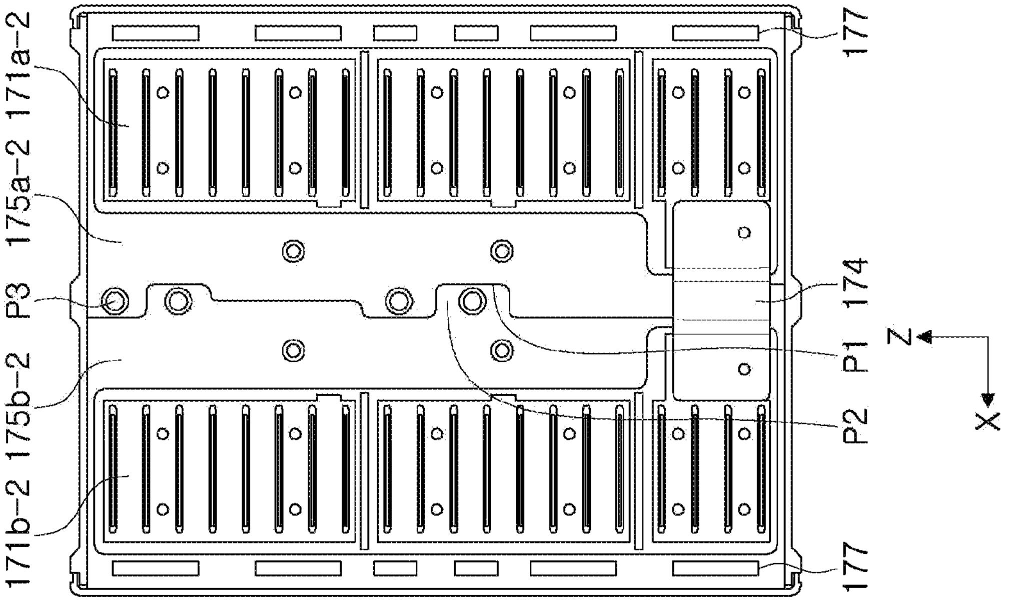
FIGS. 14A and 14B are views illustrating a state in which a busbar assembly is installed in the battery module illustrated in FIG. 3.
Figure 14A:
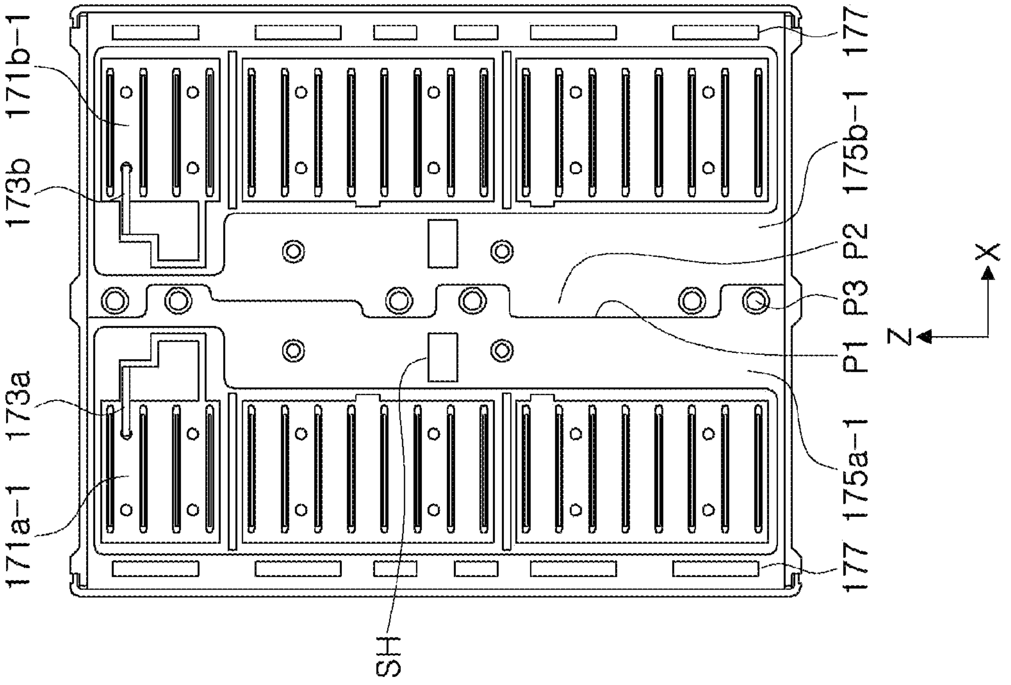

FIGS. 14A and 14B are views illustrating a state in which a busbar assembly 170 is installed in the battery module 100 illustrated in FIG. 3, FIG. 14A is a front view thereof, and FIG. 14B is a rear view thereof.

Referring to FIGS. 2, 3, 14A, and 14B together, the busbar assembly 170 may include the first assembly 170*a* and the second assembly 170*b*. The first assembly 170*a* may be electrically connected to the first stack 140*a*, and the second assembly 170*b* may be electrically connected to the second stack 140*b*.

Before the busbar assembly 170 is connected to the cell stack 140, it may be difficult to distinguish shapes of the first stack 140*a* and the second stack 140*b*, and it may be difficult to distinguish front and rear directions (the second direction) of the first stack 140*a* and front and rear directions (the second direction) of the second stack 140*b*. When the first assembly 170*a* and the second assembly 170*b* are respectively connected to the first stack 140*a* and the second stack 140*b*, each of the cell stacks 140 may be easily distinguished.

In a conventional battery module having an I-shaped frame, a plurality of cell stacks and one busbar assembly may be electrically connected in a state in which the cell stacks are respectively installed on both sides of a partition wall. In a battery module according to the prior art, when a plurality of cell stacks are connected as the single busbar assembly, since tolerance in assembly occurs during a process of installing the cell stacks in advance to a module housing, there may be problems in that it is difficult to perform a process of connecting busbars. Furthermore, occurrence of welding defects between electrode leads of battery cells and the busbars increases to reduce production yield.

In an embodiment of the present disclosure, before arranging the first stack 140*a* and the second stack 140*b* in the accommodation space of the frame member 120, the first assembly 170*a* and the second assembly 170*b* may be electrically connected to the first stack 140*a* and the second stack 140*b*, respectively. Therefore, compared to the prior art, electrical connection between the cell stack 140 (e.g., 140*a* and 140*b*) and the busbar 171 may be easily made, and there may be little possibility of welding defects occurring. For example, in an embodiment of the present disclosure, since the busbar assembly 170 may be divided into a plurality of portions, assembly efficiency may be improved in assembling each of the busbar assemblies 170 to each of the cell stacks 140. In addition, in an embodiment of the present disclosure, the number of battery cells 150 included in the cell stack 140 may increase. Therefore, a height of the cell stack 140 may increase.

The first assembly 170*a* and the second assembly 170*b* may include the first connection portion 176*a* and the second connection portion 176*b*, respectively, arranged to oppose each other in the first direction X. The first connection portion 176*a* and the second connection portion 176*b* may have concavo-convex shapes in directions opposite to each other, e.g., the first connection portion 176*a* and the second connection portion 176*b* may be uneven in the first direction X. Also, the first connection portion 176*a* and the second connection portion 176*b* may have shapes engaging with each other in the first direction X.

In this manner, the first connection portion 176*a* and the second connection portion 176*b* may be configured to have concavo-convex structures of different shapes, to be easy to distinguish between the first stack 140*a* to which the first assembly 170*a* is connected and the second stack 140*b* to which the second assembly 170*b* is connected, in the process of disposing the cell stack 140 in the accommodation spaces S1 and S2. Therefore, it is possible to prevent errors in the process of assembling the first assembly 170*a* and the second assembly 170*b* to the accommodation spaces S1 and S2 of the housing 110.

Each of the battery cells 150 may include the electrode leads 155 at both ends of the second direction Y, perpendicular to the first direction X, respectively. Therefore, the cell stack 140 may be connected to the busbar assembly 170 at both ends in the second direction Y.

Therefore, the first assembly 170*a* may include the first front assembly 170*a*-1 located in one end portion of the first stack 140*a* in the second direction Y, and a first rear assembly 170*a*-2 located in the other end portion of the first stack 140*a* in the second direction Y. The second assembly 170*b* may include a second front assembly 170*b*-1 located in one end portion of the second stack 140*b* in the second direction Y, and a second rear assembly 170*b*-2 located in the other end portion of the second stack 140*b* in the second direction Y.

In addition, each of the first front assembly 170*a*-1 and the second front assembly 170*b*-1 may include an electrode terminal 173 electrically connected to the outside. Each electrode terminal 173 may be electrically connected to at least one of a plurality of busbars 171 included in the first front assembly 170*a*-1 or at least one of a plurality of busbars 171 included in the second front assembly 170*b*-1. For example, the first front assembly 170*a*-1 may include a first electrode terminal 173*a* connected to at least one busbar 171 among the plurality of busbars 171, and the second front assembly 170*b*-1 may include a second electrode terminal 173*b* connected to at least one busbar among the plurality of busbars 171. The first electrode terminal 173*a* and the second electrode terminal 173*b* may have different polarities, and may be provided for electrical connection with the outside.

The first rear assembly 170*a*-2 and the second rear assembly 170*b*-2 may be electrically connected by a bridge busbar 174. The bridge busbar 174 may be electrically connected to at least one of a plurality of busbars 171 included in the first rear assembly 170*a*-2 and at least one of a plurality of busbars 171 included in the second rear assembly 170*b*-2. The bridge busbar 174 may bypass the partition member 128 (see FIG. 13), to be connected to a busbar 171 of the first rear assembly 170*a*-2 and a busbar 171 of the second rear assembly 170*b*-2.

In an embodiment of the present disclosure, the first stack 140*a* and the first assembly 170*a*, and the second stack 140*b* and the second assembly 170*b* may be disposed in the frame member 120 in a state in which the first stack 140*a* and the first assembly 170*a* are electrically connected to each other and the second stack 140*b* and the second assembly 170*b* are electrically connected to each other. The first assembly 170*a* and the second assembly 170*b* may be electrically connected through the bridge busbar 174 on a second end of the first stack 140*a* and a second end of the second stack 140*b*.

The busbar assembly 170 may include a plurality of busbars 171 and a busbar support member 175. Therefore, the first assembly 170*a* may include a first busbar 171*a* and a first busbar support member 175*a*, and the second assembly 170*b* may include a second busbar 171*b* and a second busbar support member 175*b*.

The first busbar support member 175*a* may include a first connection portion 176*a*, the second busbar support member 175*b* may include a second connection portion 176*b*, and the first connection portion 176*a* and the second connection portion 176*b* may have shapes engaging with each other. For example, the first connection portion 176*a* may have a concave-convex shape including a groove P1 and a tongue P2. Correspondingly, the second connection portion 176*b* may have a concave-convex shape including a tongue P2 engaged with the groove P1 of the first connection portion 176*a*, and a groove P1 engaged with the tongue P2 of the first connection portion 176*a*.

Also, the first assembly 170*a* and the second assembly 170*b* may be fastened to the partition member 128 through the first connection portion 176*a* and the second connection portion 176*b*, respectively. An assembly hole P3 through which a fastening member passes for fastening with the partition member 128 may be formed in the first connection portion 176*a* and the second connection portion 176*b*.

As described above, since the partition member 128 may be fastened to the busbar assembly 170, when the frame member 120 is divided into the first frame 120*a* and the second frame 120*b*, rigidity of the frame member 120 may be maintained. In addition, since the partition member 128 having a divided structure may be fastened and fixed to the busbar assembly 170, even though vibration occurs in a place (e.g., a car) in which the battery module 100 is installed, vibration transmitted to the partition member 128 from the battery cell 150 may be reduced.

As described with reference to FIGS. 3 and 5, the busbar assembly 170 may have a structure in which the side plate 131 is fastened. As described above, since the frame member 120 and the side plate 131 may have a structure in which they are fastened to each other around the busbar assembly 170, rigidity of the frame member 120 may further increase.

In an embodiment of the present disclosure, the frame member 120 is not limited to a structure divided into the first frame 120*a* and the second frame 120*b*, and may have an integrated structure.

Similar to the first assembly 170*a* and the second assembly 170*b*, the first front assembly 170*a*-1 may include a first front busbar 171*a*-1 and a first front support member 175*a*-1. In addition, the first rear assembly 170*a*-2 may include a first rear busbar 171*a*-2 and a first rear support member 175*a*-2. Similarly, the second front assembly 170*b*-1 may include a second front busbar 171*b*-1 and a second front support member 175*b*-1, and the second rear assembly 170*b*-2 may include a second rear busbar 171*b*-2 and a second rear support member 175*b*-2.

Figure 15:
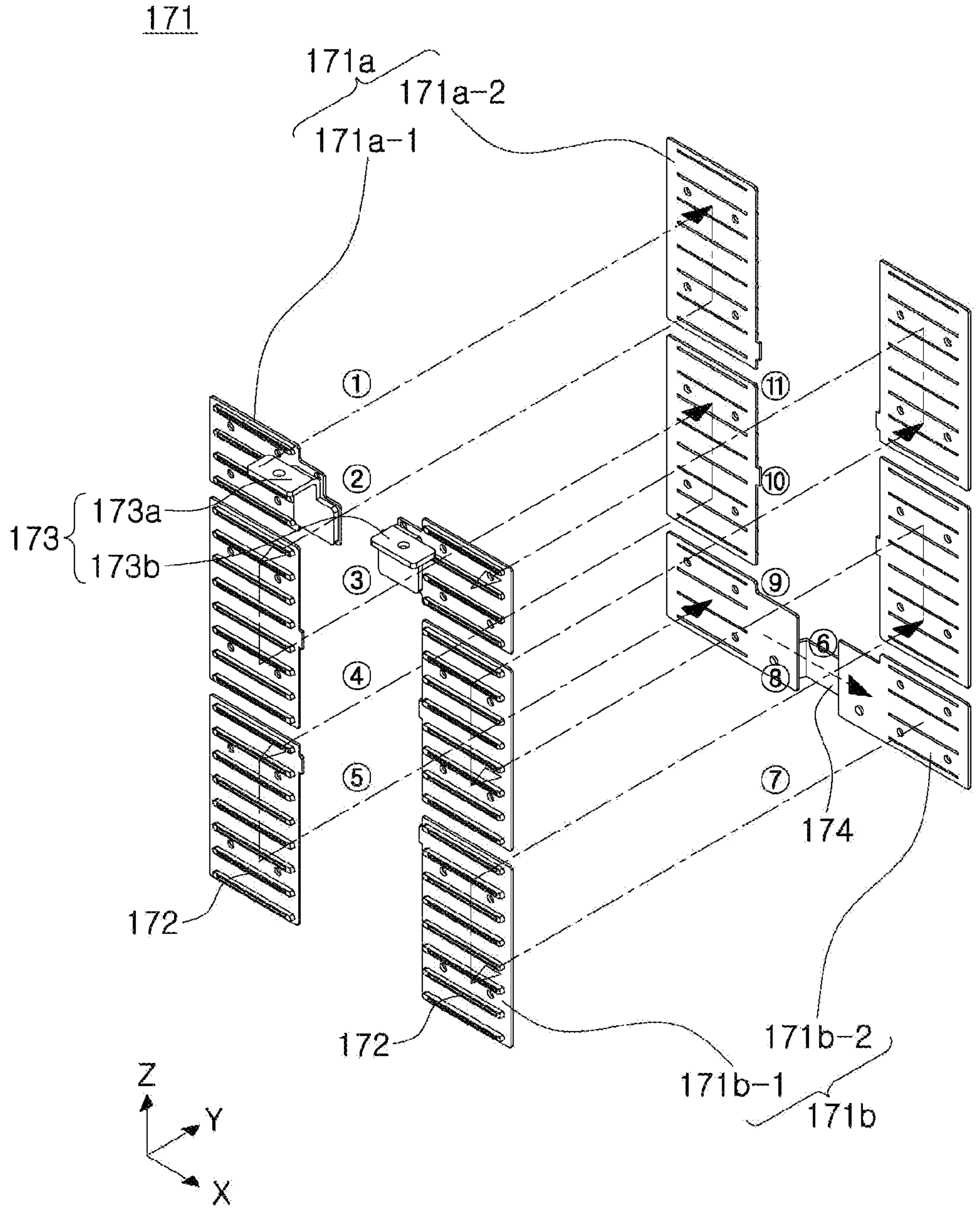
FIG. 15 is a schematic view illustrating an electrical connection relationship between the plurality of busbars in FIGS. 14A and 14B.

An electrical connection relationship between the busbar assembly 170 and the busbar 171 will be described with reference to FIG. 15. FIG. 15 is a schematic view illustrating an electrical connection relationship between the plurality of busbars 171 in FIGS. 14A and 14B. For clarity of illustration, the battery cells 150 connected between the busbars 171 will be omitted.

As illustrated in FIG. 15, the first front busbar 171*a*-1 and the first rear busbar 171*a*-2 connected to the first electrode terminal 173*a* may be electrically connected by the battery cell 150 (not illustrated). Therefore, electrical flows indicated by ① to ⑤ may be sequentially performed between the first front busbar 171*a*-1 and the first rear busbar 171*a*-2. An electrical flow indicated by ⑥ may be performed by the bridge busbar 174 between the first rear busbar 171*a*-2 and the second rear busbar 171*b*-2. And, electrical flows indicated by ⑦ to ⑪ may be sequentially performed between the second rear busbar 171*b*-2 and the second front busbar 171*b*-1. The bridge busbar 174 may electrically connect the first rear busbar 171*a*-2 of the first assembly 170*a* (see FIG. 2) and the second rear busbar 171*b*-2 of the second assembly 170*b* (see FIG. 2), on a second end of the first stack 140*a* (see FIG. 2) and on a second end of the second stack 140*b* (see FIG. 2).

In this manner, the first electrode terminal 173*a*, the first front busbar 171*a*-1, the first rear busbar 171*a*-2, the bridge busbar 174, the second rear busbar 171*b*-2, the second front busbar 171*b*-1, and the second electrode terminal 173*b* may be sequentially electrically connected. The first electrode terminal 173*a* and the second electrode terminal 173*b* may be used for electrical connection with the outside of the battery module 100.

Next, a method of manufacturing a battery module 100 according to an embodiment of the present disclosure will be described.

In the present disclosure, a method of manufacturing a battery module 100 may be roughly divided into an embodiment related to a first method and an embodiment related to a second method. The embodiment related to the first method may be focused on processes including dividedly forming a frame member 120 into a first frame 120*a* and a second frame 120*b*, and assembling a cell stack 140 (e.g., 140*a* and 140*b*) in an accommodation space S (e.g., S1 and S2) formed by the first frame 120*a* and the second frame 120*b*. The embodiment related to the second method may be focused on processes including dividedly forming a cell stack 140 and a busbar assembly 170 in a first stack 140*a* and a second stack 140*b*, and a first assembly 170*a* and a second assembly 170*b*, respectively, disposing the assemblies 170*a* and 170*b* respectively connected to the plurality of stacks 140*a* and 140*b* on a frame member 120, and then electrically connecting the first assembly 170*a* and the second assembly 170*b*. The embodiment according to the first method may have a configuration in which the frame member 120 is divided into the first frame 120*a* and the second frame 120*b* to arrange at least one cell stack 140. The embodiment related to the second method may have a configuration having the frame member 120 in which a plurality of accommodation spaces S (e.g., S1 and S2) are formed to arrange a plurality of cell stacks 140 (e.g., 140*a* and 140*b*). In the embodiment related to the second method, the frame member 120 may not be divided into a first frame 120*a* and a second frame 120*b*. The embodiment related to the first method and the embodiment related to the second method may be implemented in combination with each other.

In addition, in an embodiment of the present disclosure, a method of manufacturing a battery module 100 may include all methodological contents in the description of the battery module 100 described with reference to FIGS. 1 to 15. To avoid unnecessary duplication, only important matters among the method of manufacturing the battery module 100 will be briefly described.

Embodiment Related to First Method

An embodiment of a first method may include a preparation operation of preparing a first frame 120*a*, a second frame 120*b*, and cell stacks 140, a first coupling operation of coupling the first frame 120*a* and the second frame 120*b* to locate the first frame 120*a* and the second frame 120*b* in a first coupling position, an arrangement operation of arranging the cell stack 140, and a second coupling operation of moving the first frame 120*a* and the second frame 120*b* to a second coupling position.

In the preparation operation, various components constituting a battery module 100 may be prepared, as illustrated in FIG. 2. A frame member 120 may be divided into a first frame 120*a* and a second frame 120*b*. The first frame 120*a* and the second frame 120*b* may be coupled to each other to form at least one accommodation space S (e.g., S1 and S2). A cell stack 140 may have a state in which a plurality of battery cells 150 are stacked. In the preparation operation, a busbar assembly 170 electrically coupled to the cell stack 140, and a side plate 131 and an end plate 135 forming an exterior of a housing 110 may be additionally prepared.

The first coupling operation may be an operation of temporarily coupling the first frame 120*a* and the second frame 120*b* to locate the first frame 120*a* and the second frame 120*b* in a first coupling position, with reference to FIGS. 9B and 10B. The first coupling position may be a position such that the cell stack 140 may be easily inserted into the accommodation space S (e.g., S1 and S2). A first gap D1 between a first plate 121 and a second plate 125 in the first coupling position may be greater than a height of the cell stack 140 (a distance thereof in the third direction Z).

The arrangement operation may be an operation of inserting and arranging the cell stack 140 in the accommodation space S (e.g., S1 and S2) in the first coupling position. Since the first gap D1 of the accommodation spaces S1 and S2 in the first coupling position may be greater than the height of the cell stack 140, the cell stack 140 may be easily inserted into the accommodation space S (e.g., S1 and S2). In the arrangement operation, the cell stack 140 may not be pressed by the first plate 121 and the second plate 125.

Before the arrangement operation, the cell stack 140 may be coupled and electrically connected to the busbar assembly 170. In this case, in the arrangement operation, the cell stack 140 may be disposed in the accommodation space S (e.g., S1 and S2) with the busbar assembly 170 coupled thereto.

The second coupling operation may be an operation of moving the first frame 120*a* and the second frame 120*b* to a second coupling position, in a state in which the cell stack 140 is disposed in the accommodation space S (e.g., S1 and S2), with reference to FIGS. 9C and 10C. The second coupling position may be a state in which a gap between the first frame 120*a* and the second frame 120*b* is narrower than those in the first coupling position. In the second coupling operation, the first frame 120*a* and the second frame 120*b* may press the cell stack 140 in a direction moving from the first coupling position to the second coupling position. In addition, the second coupling operation may be configured such that the first frame 120*a* and the second frame 120*b* press the cell stack 140 in the stacking direction Z of the battery cells 150.

The first frame 120*a* and the second frame 120*b* may form two accommodation spaces S1 and S2 partitioned by a partition member 128. In this case, the second coupling operation may be configured to move the first frame 120*a* and the second frame 120*b* in a state in which the cell stack 140 (e.g., 140*a* and 140*b*) is disposed in the two accommodation spaces S1 and S2.

When the cell stack 140 includes the first stack 140*a* and the second stack 140*b*, the first stack 140*a* and the second stack 140*b* may be connected to a first busbar 171*a* and a second busbar 171*b*, respectively. In this case, the first busbar 171*a* and the second busbar 171*b* may be electrically connected to each other by a bridge busbar 174 (see FIGS. 14B and 15).

The busbar assembly 170 may be coupled to the frame member 120, and the side plate 131 may be coupled to the busbar assembly 170, with reference to FIGS. 2 to 5. Also, the endplate 135 may be configured to cover the busbar assembly 170. In this manner, when assembly of the housing 110 is completed, manufacturing a battery module 100 having an external appearance, as illustrated in FIG. 1, may be completed.

Embodiment Related to Second Method

An embodiment of a second method may include a preparation operation of preparing a first stack 140*a*, a second stack 140*b*, a first assembly 170*a*, a second assembly 170*b*, and a frame member 120, a unit forming operation of coupling the first stack 140*a* and the first assembly 170*a* to form a first unit (140*a* and 170*a*), and coupling the second stack 140*b* and the second assembly 170*b* to form a second unit (140*b* and 170*b*), an arrangement operation of disposing the first unit (140*a* and 170*a*) and the second unit (140*b* and 170*b*) in the accommodation space S (e.g., S1 and S2), and an electrical connection operation of electrically connecting the first assembly 170*a* and the second assembly 170*b*.

In the preparation operation, various components constituting a battery module 100 may be prepared, as illustrated in FIG. 2. A frame member 120 may have a plurality of accommodation spaces S (e.g., S1 and S2) partitioned by a partition member 128. Although the frame member 120 is divided into a first frame 120*a* and a second frame 120*b*, as in FIG. 2, the frame member 120 may also have an integrated structure. A cell stack 140 may include a first stack 140*a* and a second stack 140*b*. The first stack 140*a* and the second stack 140*b* may have a state in which a plurality of battery cells 150 are stacked, respectively. A busbar assembly 170 may include a first assembly 170*a* and a second assembly 170*b*. The first assembly 170*a* and the second assembly 170*b* may be configured to be electrically connected to the first stack 140*a* and the second stack 140*b*, respectively. The first assembly 170*a* and the second assembly 170*b* may have shapes engaging with each other. In the preparation operation, a side plate 131 and an end plate 135 forming an exterior of a housing 110 may be additionally prepared.

In the unit forming operation, the first stack 140*a* and the first assembly 170*a* may be electrically connected to form a first unit (140*a* and 170*a*), and the second stack 140*b* and the second assembly 170*b* may be electrically connected to form a second unit (140*b* and 170*b*) (see FIG. 9B). For example, in the unit forming operation, the first stack 140*a* and the second stack 140*b* may be respectively electrically connected the first assembly 170*a* and the second assembly 170*b*, before disposing the first stack 140*a* and the second stack 140*b* in an accommodation space. The unit forming operation may be performed by inserting an electrode lead 155 of a battery cell 150 into a coupling hole 172 of a busbar 171, and then bonding the electrode lead 155 to the busbar 171, with reference to FIG. 5.

The arrangement operation may be an operation of disposing the first unit (140*a* and 170*a*) and the second unit (140*b* and 170*b*) in the plurality of accommodation spaces S (e.g.; S1 and S2) formed in the frame member 120, respectively (refer to FIG. 9C). To easily arrange the first unit (140*a* and 170*a*) and the second unit (140*b* and 170*b*) in the accommodation space S (e.g., S1 and S2), the frame member 120 may be dividedly formed to have the first frame 120*a* and the second frame 120*b*. Even when the frame member 120 is integrally formed, the first unit (140*a* and 170*a*) and the second unit (140*b* and 170*b*) may be insert into the accommodation space S (e.g., S1 and S2) in a state in which entrance of the accommodation space S (e.g., S1 and S2) is opened.

The electrical connection operation may be an operation of electrically connecting the first assembly 170*a* and the second assembly 170*b* in at least one of both ends of the plurality of accommodation spaces S (e.g., S1 and S2). The electrical connection operation may be performed by connecting at least a portion of a first busbar 171*a* and at least a portion of a second busbar 171*b* by a bridge busbar 174 (see FIGS. 14B and 15). The bridge busbar 174 may bypass the partition member 128 (see FIG. 13) on a second end of the accommodation space S (e.g., S1 and S2), to connect a busbar 171 of a first rear assembly 170*a*-2 and a busbar 171 of a second rear assembly 170*b*-2, with reference to FIGS. 14B and 15.

After the electrical connection operation, an operation of coupling the busbar assembly 170 to the frame member 120 may be performed. To this end, an assembly hole P3 (see FIGS. 4 and 5) used for coupling a busbar support member 175 and the partition member 128 may be formed in the busbar support member 175.

In addition, after the electrical connection operation, a finishing operation of covering a portion exposed to the outside of the frame member 120, among the first unit (140*a* and 170*a*) and the second unit (140*b* and 170*b*), with a plurality of plates (e.g., 131 and 135) may proceed.

In the finishing operation, the side plate 131 may be coupled to the busbar assembly 170, with reference to FIGS. 2 to 5. For this purpose, a fastening hole P4 (see FIG. 5) may be formed in the busbar support member 175, and an assembly hole 132 (see FIG. 3) through which a fastening means B (see FIG. 3) such as a bolt or the like passes may be formed in the side plate 131. The fastening means B such as a bolt or the like may be coupled to the fastening hole P4 (see FIG. 5) of the busbar support member 175 through the assembly hole 132, with reference to FIG. 3. Therefore, coupling between the side plate 131 and the busbar assembly 170 may be achieved.

Also, the end plate 135 may be configured to cover the busbar assembly 170. The end plate 135 may be coupled to the side plate 131 and the frame member 120 by welding or the like.

In this manner, assembly of the housing 110 is completed, manufacturing a battery module 100 having an external appearance, as illustrated in FIG. 1, may be completed.

Figure 16:
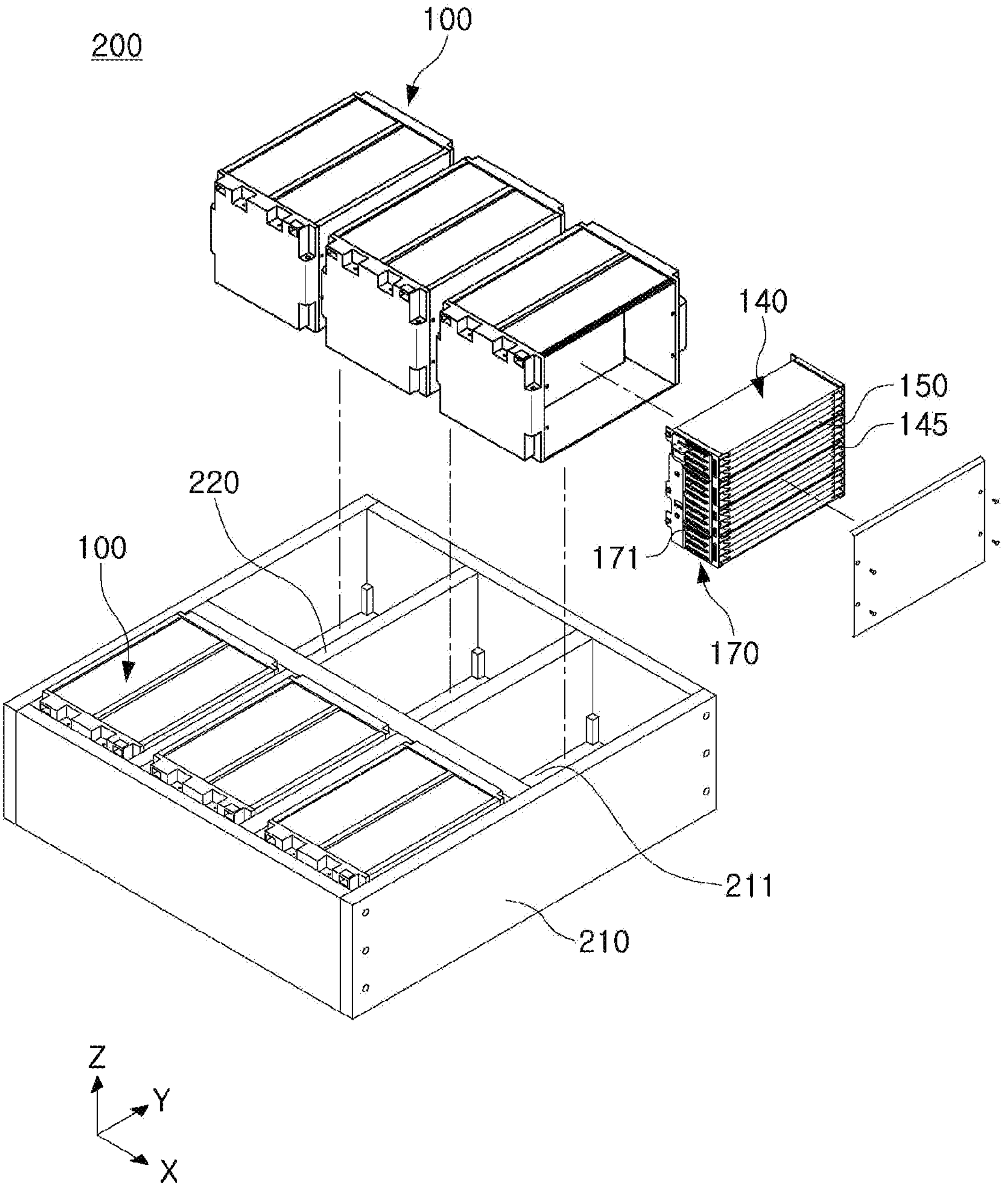
FIG. 16 is a perspective view of a battery pack according to an embodiment of the present disclosure.

Finally, a battery pack 200 according to an embodiment of the present disclosure will be described with reference to FIG. 16. FIG. 16 is a perspective view of a battery pack 200 according to an embodiment of the present disclosure. A battery pack 200 of FIG. 16 is illustrated in a state in which a pack cover covering an upper end of a pack case 210 is omitted.

A battery pack 200 may include the above-described battery module 100, and a pack case 210 accommodating a plurality of the battery module 100. The pack case 210 may include an installation space 211 accommodating the battery module 100. The installation space 211 of the pack case 210 may be divided into a plurality of installation spaces by a partition 220.

The partition 220 may be connected to an inner wall of the pack case 210, to improve strength of the pack case 210. The partition 220 may divide a space in which the battery module 100 is installed, and, even when a thermal runaway phenomenon occurs in any one battery module 100, may block propagation of the thermal runaway phenomenon to adjacent battery module 100.

In addition, the partition 220 may perform a heat dissipation and/or cooling function of discharging heat generated in the battery module 100 externally. For example, the partition 220 may also function as a cooling member 160 (see FIG. 13) of the battery module 100. In this case, the partition 220 may be disposed to contact two adjacent battery modules 100 to perform cooling of the two adjacent battery modules 100.

While example embodiments have been illustrated and described above, it will be apparent to those skilled in the art that modifications and variations could be made without departing from the scope of the present disclosure as defined by the appended claims.

In addition, it may be implemented by deleting some components in the above-described embodiment, and each embodiment may be implemented in combination with each other.

In particular, in an embodiment that may not be directly related to a process of inserting a cell stack 140 into an accommodation space S, a frame member 120 may not be divided into a first frame 120*a* and a second frame 120*b*, and may have an integral structure.

According to an embodiment of the present disclosure, an effect of allowing a process of inserting a cell stack into a module housing to be easily performed may be obtained.

Further, according to an embodiment, there may be an effect of improving assembly performance between a busbar assembly and a cell stack.

In addition, according to an embodiment, an effect of increasing a height of a battery module may be obtained.

In addition, according to an embodiment, an effect of having improved cooling performance of a battery module may be obtained.

And, according to an embodiment, an effect of reducing or delaying heat propagation between battery cells and/or between cell stacks may be obtained.

What is claimed is:

1. A battery module comprising:

a plurality of cell stacks, each of the plurality of cell stacks including a plurality of battery cells; and a housing having a plurality of accommodation spaces partitioned by a partition member, to accommodate the plurality of the cell stacks, wherein the housing includes a first frame and a second frame, coupled to each other to form the plurality of accommodation spaces, wherein the plurality of cell stacks includes a first cell stack and a second cell stack, wherein the plurality of accommodation spaces includes a first accommodation space disposed on a first side of the partition member and accommodating the first cell stack, and a second accommodation space disposed on a second side of the partition member and accommodating the second cell stack, wherein the first frame comprises a first plate facing an upper surface of the first cell stack and an upper surface of the second cell stack, and a first extension plate extending from the first plate and facing a lateral surface of the first cell stack and a lateral surface of the second cell stack, wherein the second frame comprises a second plate spaced apart from the first plate, and a second extension plate extending from the second plate and facing the lateral surface of the first cell stack and the lateral surface of the second cell stack, wherein the first extension plate and the second extension plate correspond to the partition member, wherein the first extension plate and the second extension plate include a coupling portion that is coupled in a fitting coupling manner, respectively, wherein the first frame and the second frame are arranged in a first coupling position for inserting the first cell stack and the second cell stack into the first accommodation space and the second accommodation space, respectively, or a second coupling position, of which a gap between the first plate and the second plate is narrower than a gap between the first plate and the second plate in the first coupling position, and wherein the coupling portion is configured such that the first frame and the second frame are arranged in the first coupling position or the second coupling position.

2. The battery module of claim 1, wherein, in the second coupling position, the first frame and the second frame compress the plurality of cell stacks in a direction away from the first coupling position to the second coupling position.

3. The battery module of claim 1, wherein, in the second coupling position, the first frame and the second frame compress the plurality of cell stacks in a direction in which the plurality of battery cells are stacked.

4. The battery module of claim 1, wherein the coupling portion comprises a first coupling portion included in the first extension plate of the first frame and a second coupling portion included in the second extension plate of the second frame, wherein one of the first coupling portion and the second coupling portion includes a tongue portion, and the other of the first coupling portion and the second coupling portion includes a groove portion into which the tongue portion is inserted and coupled.

5. The battery module of claim 4, wherein the first coupling portion and the second coupling portion comprise a stopping member maintaining a coupled state of the first coupling portion and the second coupling portion in the first coupling position, respectively.

6. The battery module of claim 4, wherein the tongue portion is maximally inserted into an inner space of the groove portion in the second coupling position.

7. The battery module of claim 4, wherein the first coupling portion and the second coupling portion comprise a position fixing member maintaining a coupled state of the first coupling portion and the second coupling portion in the second coupling position, respectively.

8. The battery module of claim 4, wherein, based on a cross-section in a direction in which the tongue portion extends, the tongue portion and the groove portion have a shape in which a width decreases in a direction in which the tongue portion extends, respectively, and at least a portion of the tongue portion is exposed to an outside of the groove portion in the first coupling position.

9. The battery module of claim 8, wherein the tongue portion is forcedly inserted into the groove portion in the second coupling position.

10. The battery module of claim 4, wherein an adhesive member fixing a position of the tongue portion in the second coupling position is disposed in the groove portion.

11. The battery module of claim 1, wherein the first frame and the second frame have a T-shaped cross-section, respectively, and two accommodation spaces in which the first cell stack and the second cell stack are accommodated on the first side and the second side of the partition member, respectively, are formed in the housing.

12. The battery module of claim 1, wherein the housing further comprises a cover plate forming the plurality of accommodation spaces together with the first frame and the second frame, wherein the cover plate includes side plates disposed to oppose the first extension plate and the second extension plate and end plates disposed on front and rear surfaces of the plurality of cell stacks, respectively.

13. The battery module of claim 12, further comprising a busbar assembly disposed between at least one of the plurality of cell stacks and at least one of the end plates, wherein the busbar assembly includes at least one a busbar electrically connected to electrode leads of the plurality of the battery cells, and a busbar support member on which the at least one busbar is installed, and wherein each of the side plates is fastened to the busbar support member.

14. The battery module of claim 12, wherein the plurality of the battery cells comprise a pouch-type secondary battery in which a sealing portion is formed on three sides of a cell body portion for accommodating an electrode assembly, and wherein the plurality of cell stacks are disposed such that a contact surface of the cell body portion on which the sealing portion is not formed opposes the side plates.

15. The battery module of claim 14, wherein a thermally conductive adhesive is disposed between the contact surface and at least one of the side plates, and heat generated by the plurality of cell stacks is discharged through at least one of the side plates externally.

16. The battery module of claim 15, wherein an outer surface of at least one of the side plates is in contact with a cooling member.

17. The battery module of claim 1, wherein a heat insulating member is installed between at least one of the plurality of cell stacks and the partition member.

18. A method of manufacturing a battery module, comprising:

preparing a first frame and a second frame, coupled to each other to form a plurality of accommodation spaces partitioned by a partition member, each of a plurality of cell stacks being inserted into each of the plurality of accommodation spaces;

coupling the first frame and the second frame to have a first coupling position for arranging the plurality of cell stacks in the plurality of accommodation spaces, respectively; and moving the first frame and the second frame to be a second coupling position, in a state in which the plurality of cell stacks are disposed in the plurality of accommodation spaces, wherein the plurality of cell stacks includes a first cell stack and a second cell stack, wherein the plurality of accommodation spaces includes a first accommodation space disposed on a first side of the partition member and accommodating the first cell stack, and a second accommodation space disposed on a second side of the partition member and accommodating the second cell stack, wherein the first frame comprises a first plate facing an upper surface of the first cell stack and an upper surface of the second cell stack, and a first extension plate extending from the first plate and facing a lateral surface of the first cell stack and a lateral surface of the second cell stack, wherein the second frame comprises a second plate spaced apart from the first plate, and a second extension plate extending from the second plate and facing the lateral surface of the first cell stack and the lateral surface of the second cell stack, wherein the first extension plate and the second extension plate correspond to the partition member, wherein the first extension plate and the second extension plate include a coupling portion that is coupled in a fitting coupling manner, respectively, wherein, in coupling the first frame and the second frame to have the first coupling position, the first cell stack and the second cell stack are inserted into the first accommodation space and the second accommodation space, respectively, wherein, in the second coupling position, a gap between the first plate and the second plate is narrower than a gap between the first plate and the second plate in the first coupling position, and wherein, in moving the first frame and the second frame to be the second coupling position, the first frame and the second frame are moved from the first coupling position to the second coupling position.

* * * * *